Feb. 22, 1938.  C. C. FARMER ET AL  2,109,166
BRAKE CONTROL FOR HIGH SPEED TRAINS
Filed Sept. 17, 1935  3 Sheets-Sheet 1
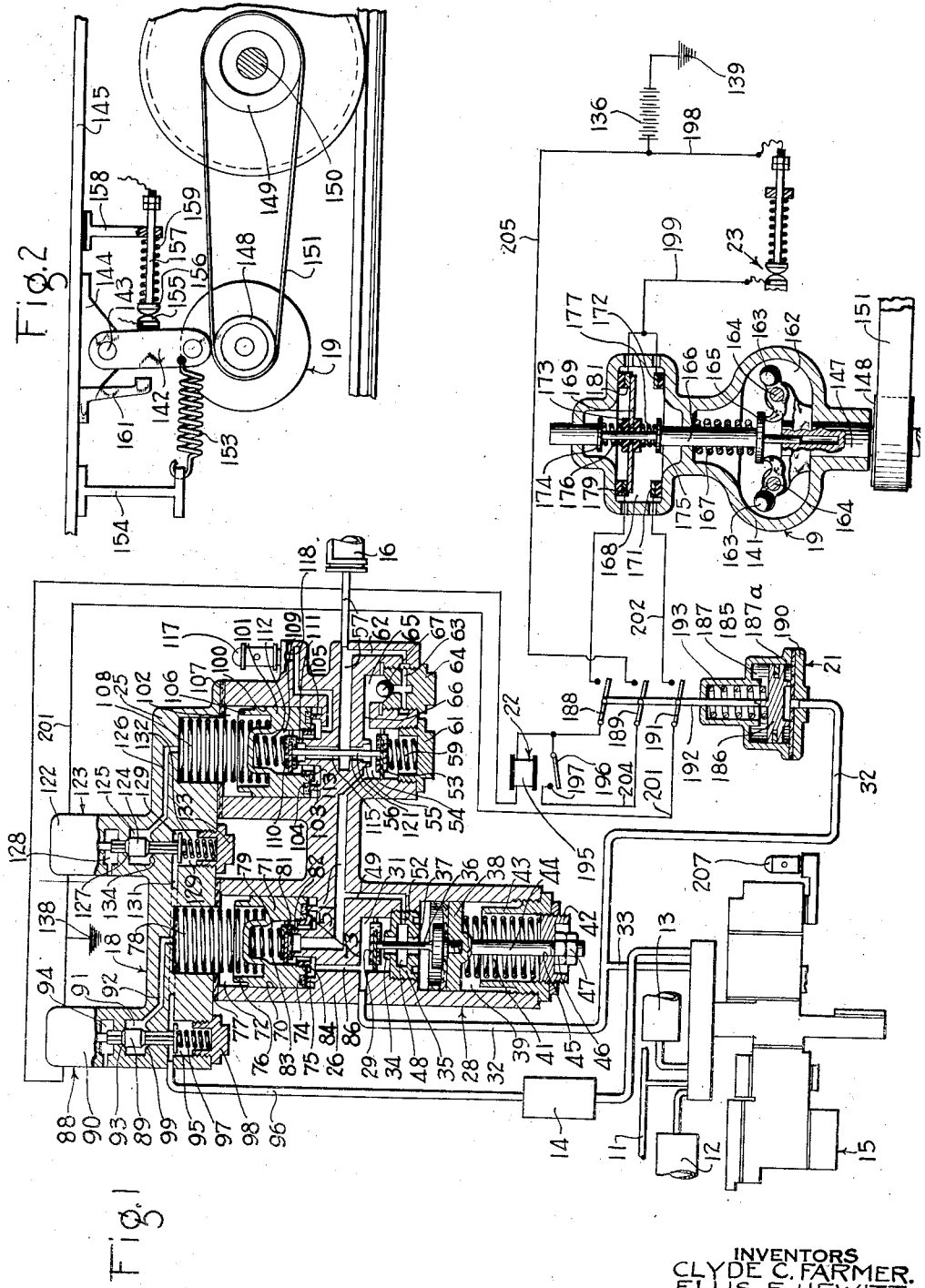
INVENTORS
CLYDE C. FARMER.
ELLIS E. HEWITT.
BY Wm. M. Cady
ATTORNEY

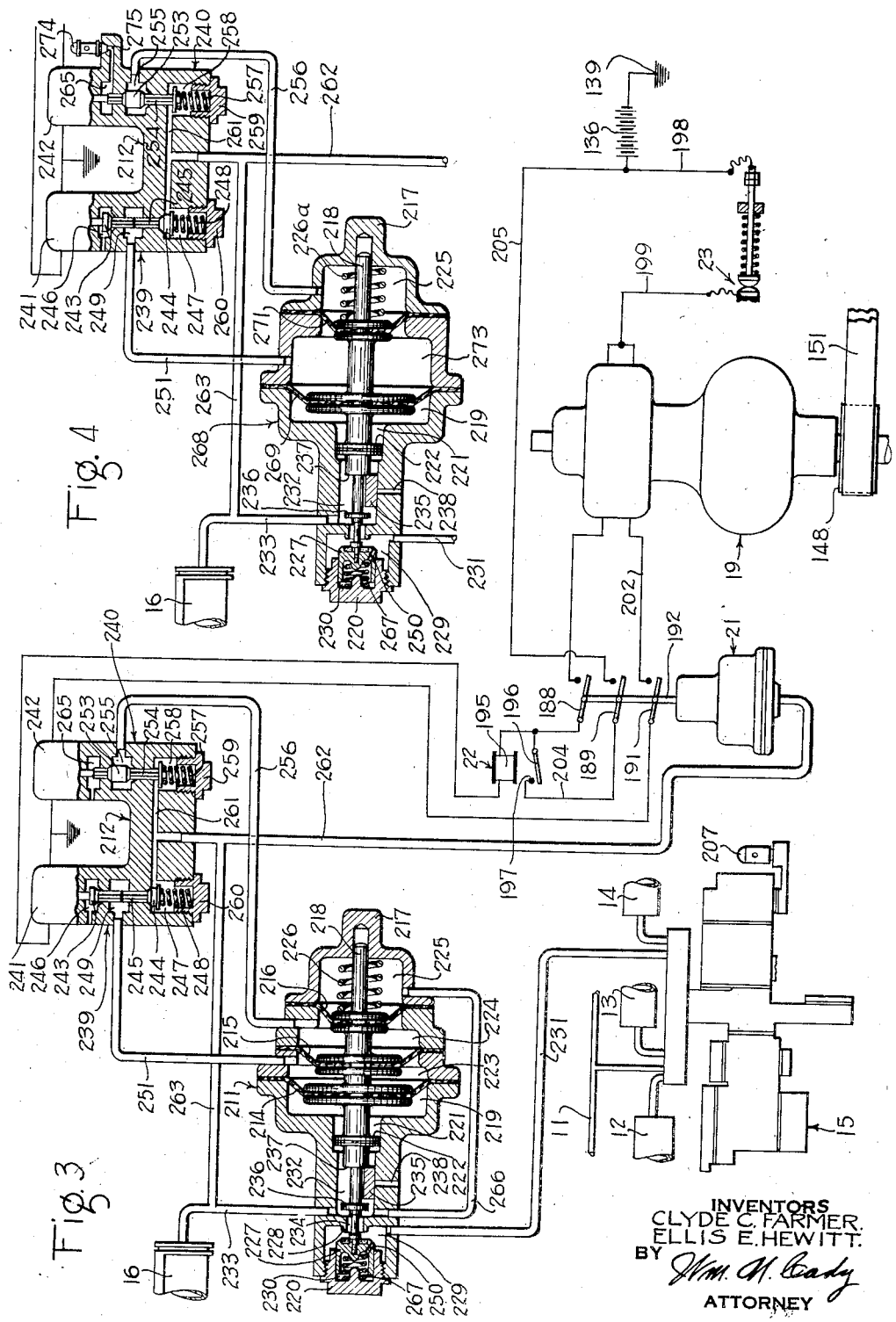

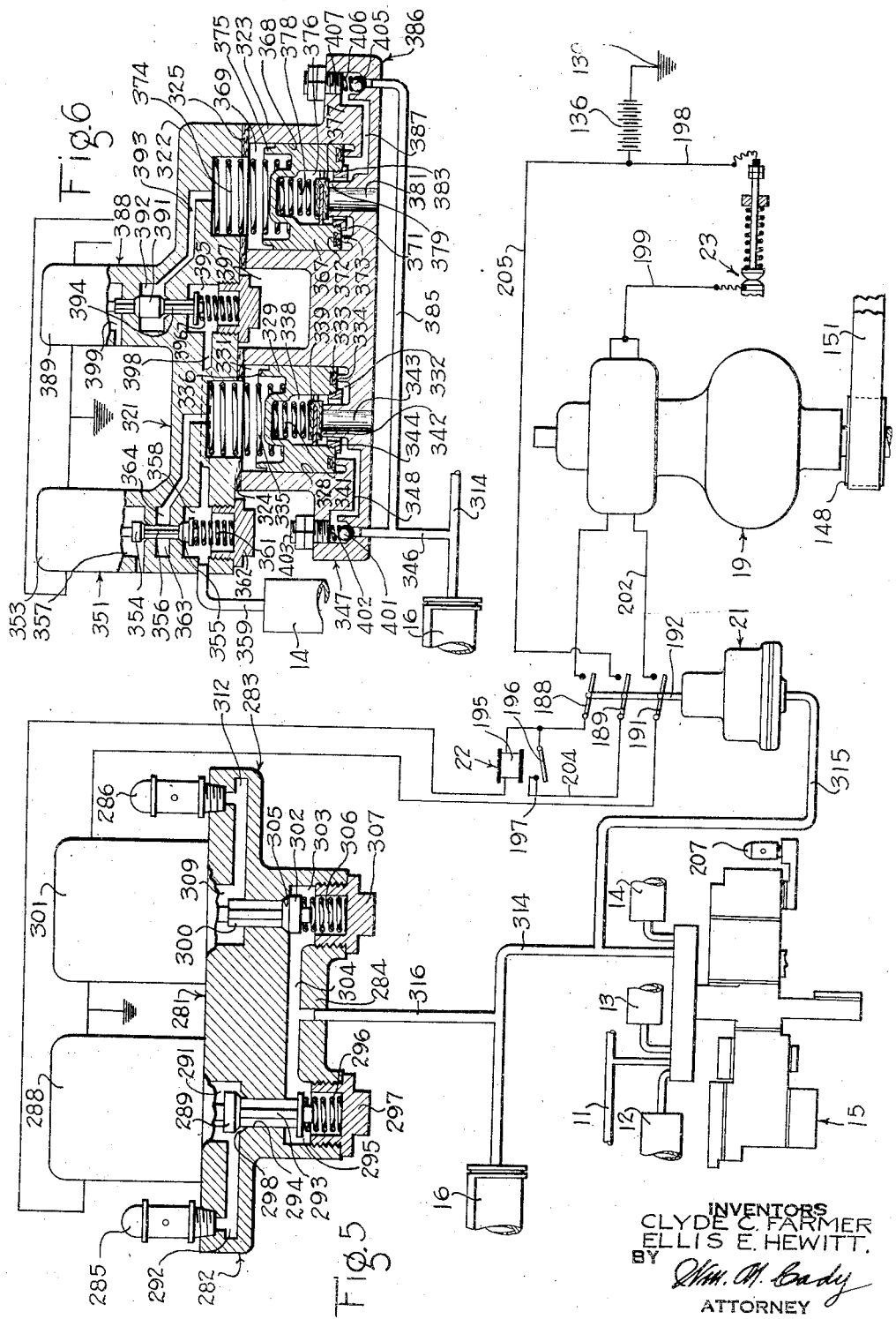

UNITED STATES PATENT OFFICE 2,109,166

BRAKE CONTROL FOR HIGH SPEED TRAINS

Clyde C. Farmer, Pittsburgh, and Ellis E. Hewitt, Edgewood, Pa., assignors to The Westinghouse Air Brake Company, Wilmerding, Pa., a corporation of Pennsylvania Application September 17, 1935, Serial No. 40,902

82 Claims. (Cl. 303—21)

This invention relates to brake control for high speed trains, and has particular relation to devices for adapting present standard brake control equipment for high speed service.

In the present standard brake equipment for steam road passenger service, the brake controlling valve device commonly employed is the well known Westinghouse universal valve which is adapted to supply fluid under pressure from the usual auxiliary reservoir, service reservoir, and emergency reservoir to the brake cylinder in such manner that the maximum brake cylinder pressure attainable in an emergency application of the brakes is approximately seventy-five pounds per square inch, which effects a braking ratio of about one hundred and fifty per cent. The term "braking ratio" as employed herein, should be understood as the ratio between the braking force, that is, the total pressure of the brake shoes upon the car wheels, and the empty weight of the car, the ratio being expressed as per cent of the empty weight of the car. It has been found that for speeds up to sixty miles per hour in passenger service, a braking ratio of one hundred and fifty per cent in emergency applications is satisfactory in that such braking ratio imparts the most effective retardation or braking action with only a moderate amount of wheel sliding at the lower speeds.

It is now proposed to employ present standard passenger cars in high speed service wherein the normal speed of travel may attain the degree of one hundred miles per hour or more. With the present brake equipment on passenger cars, the stopping distance will be greatly lengthened over the normal stopping distance in decelerating from speeds higher than the present maximum speeds due to the increased amount of kinetic energy stored in the moving train, the energy being proportional to the square of the velocity or speed of the train. It will thus be apparent that in order to stop a train in substantially the same distance, from a speed of one hundred miles per hour as from a speed of sixty miles per hour, approximately three times as much braking effort or work must be expended. Furthermore, the heat generated in the brake shoes is greater when the speed of the train at the time the application of the brakes is initiated is relatively high as compared to the heat generated in the brake shoes when the speed of the train at the time an application of the brakes is initiated is relatively low, and as is well known the coefficient of friction between a brake shoe and its associated car wheel decreases as the heat developed in the brake shoes increases. This factor in itself, therefore, also necessitates the application of greater braking force in order to bring a train to a stop in the same distance from a higher speed as from a lower speed.

Since present standard brake equipment for passenger cars is not adapted to provide more than a one hundred and fifty per cent braking ratio, and since high speed service requires higher braking ratios than one hundred and fifty per cent, it will be apparent that brake control equipment, especially designed for high speed service, or equipment, supplemental to the present standard brake equipment and functioning to adapt the standard brake equipment for high speed service, is necessary.

In view of the fact that it would be an extremely costly undertaking to scrap all of the present standard brake equipment on passenger cars and also in view of the fact that such equipment may still be in a serviceable condition, it is desirable to modify the present standard braking equipment for passenger cars, by providing supplemental equipment adapted to function in cooperation therewith for high speed service, the cost of conversion being less than the cost of replacing the present standard braking equipment with new equipment especially designed for high speed service.

It is, therefore, an object of our invention to provide supplemental equipment to be used in conjunction with present standard brake control equipment on passenger cars, which supplemental equipment adapts present standard braking equipment for use in high speed service.

Another object of our invention is to provide supplemental equipment to be used in conjunction with present standard brake control equipment on passenger cars, whereby higher brake cylinder pressures and accordingly higher braking ratios may be attained relative to the brake cylinder pressures and braking ratios attainable with present standard brake equipment, in order to enable a train to be stopped in substantially the same distance upon the initiation of a brake application at a relatively high speed as upon the initiation of a brake application at a lower speed.

Another object of our invention is to provide brake control equipment adapted to automatically select different braking ratios dependent upon the speed of the train at the time an application of the brakes is initiated.

Another object of our invention is to provide brake control equipment of the above character, adapted to automatically reduce brake cylinder pressure and accordingly the braking ratio, as the train decreases in speed upon an application of the brakes, to prevent sliding of the wheels.

A further object of our invention is to provide brake control equipment adapted to function automatically to reduce the brake cylinder pressure and accordingly the braking ratio as the speed of the train reduces to a relatively low degree upon an application of the brakes, the degree to which the brake cylinder pressure and braking ratio is finally reduced being different, dependent upon the speed of the train at the time the application of the brakes was initiated, compensation for variations in the coefficient of friction between the brake shoes and car wheels occasioned as a result of the initial application of the brake shoes to the car wheels at different speeds, being thus automatically effected.

The above objects, and other objects of our invention which will be made apparent hereinafter, are attained by means of illustrative embodiments of our invention shown in the accompanying drawings, wherein Figure 1 is a diagrammatic view, partly in section, showing one embodiment of our invention, Figure 2 is a fragmentary diagrammatic view, illustrating a mechanism for operating one of the switch devices shown in Figure 1, Figure 3 is a diagrammatic view, partly in section, illustrating another embodiment of our invention, Figure 4 is a diagrammatic view, partly in section, illustrating a modified valve mechanism which may be substituted for the corresponding valve mechanism shown in Figure 3, Figure 5 is another illustrative embodiment of our invention, and Figure 6 is a diagrammatic view, partly in section, illustrating a modified valve mechanism which may be substituted for the corresponding valve mechanism shown in Figure 5.

Referring to Figure 1, the equipment shown therein comprises the usual passenger car equipment including a brake pipe 11, auxiliary reservoir 12, service reservoir 13, emergency reservoir 14, a brake controlling valve device 15 for passenger cars, such as the well known Westinghouse universal valve, and brake cylinder 16. Since the operation of this standard brake equipment for passenger cars is well known, it is deemed unnecessary to show and describe the details of construction or specifically explain the operation thereof, except to note that the emergency reservoir 14 and the brake cylinder 16 differ from the present standard equipment as to relative capacities, in order to enable higher brake cylinder pressure to be attained in the manner hereinafter described.

In accordance with our invention, equipment supplemental to the standard brake equipment for passenger cars is employed, comprising a supplemental valve mechanism 18, for regulating the fluid under pressure supplied from the reservoirs to the brake cylinder 16 under the control of valve device 15, and thereby determining the braking ratio, a centrifugal governor device 19, a fluid pressure operated electric switch device 21, a circuit-maintaining relay 22 of self-holding type, and a switch device 23 associated with the support for the governor device 19.

The supplemental valve mechanism 18 comprises an electromagnet valve casing section 25 and a controlling valve casing section 26.

Included in the casing section 26 is an inshot valve device 28 comprising a disc valve 29 guidably mounted in a chamber 31 which is connected to the brake cylinder supply port of the valve device 15 through a pipe 32 and branch pipe 33. The valve 29 is normally maintained unseated from a cooperating annular rib seat 34 on a threaded collar 35 screwed into the chamber 31, by a stem 36 which extends through a passage 37 in the collar 35 and which is secured to a piston 38 mounted in a chamber 39, the piston being normally biased to unseat the valve 29 by a coil spring 41 interposed between the piston 38 and a screw plug 42. The screw plug 42 is threaded into an internally threaded collar 43 which is in turn threaded into the open end of the chamber 39, the inner end of the collar serving to limit the downward movement of the piston 38. The piston 38 has a stem 44 which extends slidably through a hole 45 in the plug 42 to the exterior of the casing, and the stem 44 is provided on the outer threaded end thereof with a nut 46 and lock nut 47 adapted to limit the upward movement of the piston 38 by the spring 41 upon engagement of the nut 46 with the outer surface of the plug 42. The collar 35 has a chamber 48 which is an enlarged portion of passage 37, the chamber being connected through a port 52 in the wall of the collar to a passage 49 in the casing leading to another passage 51.

A disc type cut-off valve 53, which is guidably mounted in a chamber 54 and which cooperates with an annular rib seat 55, serves to control communication through a passage 56 from chamber 54 and passage 51 which opens into chamber 54, to a passage and pipe 57 leading to the brake cylinder 16.

The valve 53 is urged toward the annular rib seat 55 by a coil spring 59 interposed between the valve and a screw plug 61 closing the chamber 54, and is normally unseated against the force of spring 59, as will be described hereinafter.

A check valve 67, disposed in a chamber 65, and cooperating with a valve seat formed on the inner face of a screw plug 64 screwed into and closing the chamber 65, is adapted to prevent flow of fluid under pressure around the cut-off valve 53 from the chamber 54 to the brake cylinder passage 57 and to permit reverse flow of fluid under pressure from the brake cylinder passage 57 to chamber 54, through a passage 62, a passage 63 in the screw plug opening at the valve seat therein, chamber 65 and a passage 66, for a reason which will be made apparent hereinafter.

The supplemental valve mechanism 18 further comprises a valve piston 71 slidably movable in a bore 70 and having a chamber 72 at one side thereof and a chamber 73 at the opposite side thereof. The valve piston 71 has an annular gasket 74, inset in the face thereof open toward chamber 73, adapted to engage an annular rib seat 75, of smaller diameter than the bore 70, when the piston is at one extremity of its movement, and has also an annular rib 76 on the opposite face thereof adapted to engage a gasket 77 interposed between casing sections 25 and 26, when the valve piston is moved to the opposite extremity of its movement. A coil spring 78 disposed in the chamber 72 between one face of the valve piston 71 and the casing section 25 urges the valve piston into engagement with the annular rib seat 75.

The valve piston 71 has a chamber or recess 79 opening at the face thereof into chamber 73, which chamber 79 contains a disc type valve 81 guidably mounted therein and yieldingly urged into seated relation on an annular rib seat 82 by a spring 83 interposed in the chamber 79 between the valve 81 and the valve piston 71. A collar 84 threaded into the valve piston 71 at the open end of the recess 79 is adapted to engage the projecting guide lugs on the valve 81 to limit the outward movement of the valve 81 in the recess 79, the valve 81 being thus unseated from the annular rib seat 82 when the valve piston 71 is moved away from the annular rib seat 75.

The valve 81 controls a communication between chamber 31 of the inshot valve device 28 and the passage 51, the passage 51 terminating at the inner seated area of the valve 81, and the chamber 31 being in communication with chamber 73, at a point inside the annular rib seat 75, through a passage 86. Thus when valve 81 is unseated from the rib seat 82, a communication from the brake cylinder supply pipe 32 to the brake cylinder passage 51, in parallel with that controlled by the valve 29 is established.

The chamber 72 at the one side of the valve piston 71 is normally supplied with fluid under pressure from a suitable reservoir, such as the emergency reservoir 14, for holding the valve piston 71 seated on the rib seat 75 against the pressure of the fluid supplied to the brake cylinder through pipe 32, and acting on the opposite face of the valve piston in chamber 73.

For the purpose of controlling the supply of fluid under pressure to and the release of fluid under pressure from the chamber 72, an electromagnet valve device 88 is provided in the casing section 25, comprising a suitable electromagnet 90, for operating a double beat valve 89 disposed in a chamber 91 which is in constant communication with the chamber 72 through a passage 92. When the electromagnet 90 of the magnet valve device 88 is deenergized the double beat valve 89 is urged into seated relation on a valve seat 93 to close communication between the chamber 91 and an atmospheric chamber 94, and to simultaneously open communication between the chamber 91 and a chamber 95 which is connected to a suitable reservoir, such as the emergency reservoir 14, through the pipe 96. A spring 97 contained in the chamber 95 and interposed between a collar, secured to a fluted stem of the double beat valve 89, and a screw plug 98 closing the chamber 95, is provided for yieldingly urging the double beat valve into seated relation on the valve seat 93.

When the electromagnet 90 of the magnet valve device 88 is energized, the double beat valve 89 is moved against the force of the spring 97 into seated relation on a valve seat 99 to close the communication from chamber 95 to chamber 91, and is simultaneously unseated from the valve seat 93 to open communication from the chamber 91 to the atmospheric chamber 94.

The supplemental valve mechanism 18 also further comprises a valve piston 101 slidably movable in a bore 100 and having a chamber 102 at one side thereof and a chamber 103 at the other side thereof. Inset in the face of the valve piston 101 open toward chamber 103 is an annular gasket 104 which engages an annular rib seat 105, the other face of the valve piston having an annular rib 106 thereon which is adapted to engage, in sealing relation, a gasket 107 interposed between the casing sections 25 and 26. A coil spring 108 disposed in the chamber 102 and interposed between the valve piston 101 and the casing section 25 serves to yieldingly urge the valve piston 101 into seated relation on the annular rib seat 105.

The valve piston 101 has a chamber or recess 109 in the face thereof opening into the chamber 103, in which chamber 109 is guidably mounted a disc type valve 110 which is yieldingly urged into seated relation on an annular rib seat 111 by a spring 112 contained in chamber 109 and interposed between the valve 110 and the valve piston 101.

A threaded collar 113 screwed into the face of the valve piston 101 at the open end of the chamber 109 is adapted to engage the projecting guide lugs of the valve 110 and to unseat the valve from the annular rib seat 111, as the valve piston 101 is moved away from the annular rib seat 105.

The inner seated area of the valve 110 is in communication with the brake cylinder passage 57 through a passage 115, and the chamber 103 is in communication with a suitable blow-down or pressure valve device 117 through a passage 118 opening inside the annular rib seat 105. When seated on the rib seat 111, the valve 110 closes the passage 115 and thus closes off communication between the passage 57 and the blow-down valve 117, and when unseated opens communication between the passage 57 and the blow-down valve 117.

Blow-down valve 117 is set to maintain a predetermined brake cylinder pressure, such as fifty pounds per square inch, which is adequate to stop the car or train but which is insufficient to cause sliding of the wheels at the lower speeds.

In order to cause the cut-off valve 53 to be unseated from the annular rib seat 55 and thereby permit a supply of fluid under pressure from the pipe 32 and passage 51 to the brake cylinder passage 57, a stem 121 is provided which extends through passages 56 and 115 and which has its opposite ends engaging the valves 110 and 53, respectively, the stem 121 being of sufficient length to maintain the valve 53 unseated as long as the valve 110 is seated on the annular rib seat 111. In this connection it should be understood that the tension of spring 112 is effective, when the valve piston 101 is held on the rib seat 105 by the pressure of fluid in chamber 102, to hold the valve 110 on the annular rib seat 111 against the opposing force of spring 59 exerted through valve 53 and stem 121 and the maximum brake cylinder pressure exerted on the inner seated area of valve 110 through passage 115. When the valve 110 is unseated from the rib seat 111 to establish communication between the brake cylinder passage 57 and the blow-down valve 117, the spring 59 is simultaneously effective to move the valve 53 into seated relation on the rib seat 55 to cut off the supply of fluid under pressure through the passage 56 from the passage 51 to the brake cylinder passage 57.

The supply of fluid under pressure to and the release of fluid under pressure from the chamber 102 is controlled by a magnet valve device 123 comprising an electromagnet 122 and a double beat valve 124 operated by the electromagnet 122, the valve 124 being contained in a chamber 125 which is in constant communication with the chamber 102 through a passage 126.

When the electromagnet 122 of the magnet valve device 123 is deenergized, the double beat valve 124 is moved into seated relation on a valve seat 127 to close off the communication between chamber 125 and an atmospheric chamber 130, and is simultaneously unseated from a valve seat 134 to open communication between chamber 125 and a chamber 129 which is in constant communication with the chamber 95 of the magnet valve device 88 through a passage 131.

A coil spring 132, disposed in the chamber 129 and interposed between a collar secured to a fluted stem of the valve 124, and a screw plug 133 closing the chamber 129, urges the valve 124 into seated relation on the valve seat 127.

When the electromagnet 122 is energized, the double beat valve 124 is moved against the force of spring 132 into seated relation on the valve seat 134 to cut off communication between chamber 129 and chamber 125, and is simultaneously unseated from the valve seat 127 to open communication between the chamber 125 and the atmospheric chamber 128.

The electromagnets 90 and 122 of the magnet valve devices 88 and 123 respectively, are adapted to be supplied with energizing current from a suitable source, such as a battery 136 carried on the train, in a manner specifically described hereinafter, under the control of the governor device 19 and the switch device 21.

The governor device 19 comprises a suitable casing 141 adapted to be pivotally suspended from the floor 145 of the car on a pair of struts or links 142, only one of which is shown in Figure 2, the links 142 being secured at one end, to opposite ends of the casing 141, respectively, as by bolts, rivets or welding, and pivotally suspended at the other end on lugs or pins 143 formed on or secured to an associated bracket 144 which is suitably secured to the lower face of the car floor 145, as by bolts or screws, not shown.

The governor device 19 further comprises a rotary shaft 147 which is suitably mounted in a sleeve-like portion of the casing 141 and which projects exteriorly of the casing, a pulley 148 being secured to the outer end of the shaft 147, which pulley is driven directly from a suitably proportioned pulley 149 mounted on a car wheel axle 150 through the medium of an endless belt 151. If desired, the pulley 148 may be driven in any other suitable manner in accordance with the speed of the train, as from a pulley mounted on the armature shaft of the usual generator carried on the train.

One of the supporting links 142 for the governor device 19 carries thereon an insulated contact member 155 of the switch device 23, and when the belt 151 is properly positioned over the pulleys 148 and 149, the contact member 155 engages a contact member 156 of the switch device 23, which latter contact member is carried on a stem 157 slidably mounted in a bracket 158 carried in insulated depending relation on the floor 145 of the car. A coil spring 159, interposed between the contact member 156 and the bracket 158, yieldingly urges the contact member 156 into engagement with the contact member 155 to close a circuit therethrough, which circuit will be hereinafter described.

A coil spring 153 secured, at one end, to one of the supporting links 142 of the governor device and at the other end, to a bracket 154 secured in depending relation from the car floor 145 serves to tension the driving belt 151 and also to separate the contact members 155 and 156 of the switch device 23 in the event of breakage of the belt 151 or in the event that the belt 151 is disengaged from the pulleys 148 and 149.

A pair of stop brackets or lugs 161, only one of which is shown, suitaby secured to the floor of the car or formed on the brackets 144 are adapted to be engaged by the links 142, respectively, to limit the movement of the governor device 19 by the spring 153.

The inner end of the rotary shaft 147 of the governor device 19 extends into a chamber 162 in the casing 141 and has mounted thereon a plurality of fly-ball weighted levers 163, pivoted on suitable pins 164 and adapted to move radially outwardly in accordance with the speed of rotation of the shaft 147. The inner ends of the weighted levers 163 are adapted to cooperate with a collar 165 formed on or secured to a switch actuating stem 166. A coil spring 167, interposed between the casing 141 and the collar 165, yieldingly resists longitudinal movement of the stem 166 as the weighted levers move outwardly with increasing speed of rotation of the shaft 147. The stem 166 extends into a chamber 168 in the casing 141 and has a contact bridging member 169 carried in insulated relation thereon, as hereinafter described, within the chamber 168.

When the speed of the train, and consequently the speed of rotation of the shaft 147 is less than a certain degree, such as that corresponding to ten or fifteen miles per hour, the spring 167 moves the stem 166 longitudinally to cause the bridging member 169 to engage and connect a pair of spaced contact members 171 and 172 mounted in insulated relation upon the casing within the chamber 168. The contact bridging member 169 is carried on an insulating block 173 which is slidably mounted on a reduced portion of the stem 166 between spaced collars 174 and 175, and a pair of springs 176 and 177 interposed, respectively, between the block 173 and the collar 174, and between the block 173 and the collar 175, serve to position the contact bridging member 169 centrally between the collars 174 and 175. When the contact bridging member 169 is urged into contact with the contact members 171 and 172 as just previously described, the spring 176 yieldingly permits movement of the bridging member 169 relative to the stem 166 to limit the pressure on the contact members 171 and 172 and accordingly decrease the stress and wear on the parts.

As the speed of the train increases, the weighted levers 163 on the shaft 147 on the governor device 19 move outwardly and cause longitudinal movement of the stem 166, against the force of the spring 167, so that the contact bridging member 169 disengages the contact members 171 and 172. When the speed of the train exceeds a predetermined degree such as, for example, sixty miles an hour, the weighted levers 163 have moved outwardly a sufficient degree to cause the contact bridging member 169 to engage and connect a second set of spaced contact members 179 and 181 mounted in insulated relation on the casing 141 within the chamber 168. Upon the engagement of contact bridging member 169 with the contact members 179 and 181, the spring 177 yieldingly permits movement of the bridging member 169 relative to the stem 166 for the same reason as does the spring 176.

The fluid pressure operated switch device 21 may be of any suitable construction and is illustrated as comprising a casing 185 containing a piston 186, the piston having a chamber 187 at one side and a chamber 187a at the other side, which is closed by a cover plate 190. The piston is adapted to operate three movable contact members 188, 189, and 191 through the medium of a stem 192. A coil spring 193 disposed in chamber 187 and interposed between the casing 185 and the piston 186, serves to return the piston 186 to a position in which the movable contact members 188, 189, and 191 are in circuit-opening position. When fluid under pressure is supplied to the brake cylinder 16 through pipe 32, fluid under pressure is simultaneously supplied to chamber 187a at one side of the piston 186 through a branch of brake cylinder pipe 32 and causes the piston 186 to be moved against the force of the spring 193, to a position such that the contact members 188, 189, and 191 are in circuit-closing position, in which position the contact members remain as long as the fluid pressure overcomes the relatively low tension of spring 193.

The circuit-maintaining relay 22 is of the self-holding type and comprises an electromagnet coil 195 and a movable armature 196, which is actuated thereby to circuit-closing position in engagement with a contact member 197 upon energization of the coil 195, and which disengages the contact member 197 upon deenergization of the coil 195.

The governor device 19, the fluid pressure operated switch device 21, the circuit-maintaining relay 22, and the switch device 23 having now been described, the circuit connections between the battery 136 and the electromagnets of the magnet valve devices 88 and 123 may now be described. The contact member 156 of the switch device 23 is connected by a flexible conductor 198 to one terminal of the battery 136, the other terminal of which is grounded at 139, and the contact member 155 of the switch device 23 is connected by a conductor 199 to both of the contact members 172 and 181 of the governor device 19. In the circuit-closing position of the fluid pressure operated switch 21, contact member 188 thereof connects the electromagnet 90 of the magnet device 88 and the coil 195 of the circuit-maintaining relay 22 in series relation in a circuit extending from the contact member 179 to the ground at 138. If the contact bridging member 169 connects contact members 179 and 181, the electromagnet 90 of the magnet valve device 88 and the coil 195 of the relay 22 are energized. In the circuit-closing position thereof, the contact member 189 of the switch device 21 connects a wire 205 leading to the non-grounded terminal of the battery 136 directly to a wire 204 leading to the contact member 197 of relay 22, and with the coil of relay 22 energized, the armature 196 connects the contact member 197 to the "battery-side" terminal of coil 195 of relay 22, so that a shunt circuit is established around the governor device 19 for maintaining the coil of relay 22 and electromagnet 90 energized independently of whether or not the bridging member 169 connects contact members 179 and 181 of the governor device 19. Thus, once the coil of relay 22 is energized, it remains energized to maintain a circuit for energizing electromagnet 90 of magnet valve device 88, notwithstanding the disengagement of the contact bridging member 169 from the contact members 179 and 181, as long as the switch device 21 remains in circuit-closing position. The reason for this circuit maintaining feature will be made apparent hereinafter.

With the switch device 21 in circuit-closing position, the contact member 191 thereof connects one terminal of the electromagnet 122 of the magnet valve device 123 to the contact member 171 of the governor device 19, through conductors 201 and 202. The other terminal of electromagnet coil 122 is connected to ground at 138 and thus, if the switch device 21 is in circuit-closing position and the contact bridging member 169 connects contact members 171 and 172, the electromagnet coil 122 of the magnet valve device 123 is energized.

In operation, the brake pipe 11 is charged with fluid under pressure in the usual manner under the control of the usual brake valve device, not shown, and the auxiliary reservoir 12, the service reservoir 13, and the emergency reservoir 14 are also accordingly charged with fluid under pressure from the brake pipe 11 through the medium of the brake controlling valve device 15 in the usual manner. In the charging or release position of the valve device 15 the brake cylinder port thereof, to which the pipe 33 and pipe 32 are connected, is in communication with the atmosphere through the valve device 15 in the usual manner, and thus the brake cylinder 16 and chamber 187a of switch device 21 are connected to atmosphere. The chambers 72 and 102 at one side of the valve pistons 71 and 101, respectively, are charged with fluid under pressure from the emergency reservoir 14 through pipe 96 and past the valves 89 and 124 of the magnet valve devices 88 and 123, respectively.

Assuming that the train is running along the road at a speed, such as one hundred miles an hour, wherein the contact bridging member 169 of the governor device 19 connects the contact members 179 and 181, and that it is desired to effect an emergency application of the brakes on the train, a reduction in brake pipe pressure at an emergency rate is made in the usual manner by means of the brake valve device, not shown. The brake controlling valve device 15 then functions in the usual manner, in response to the reduction in brake pipe pressure at an emergency rate to supply fluid under pressure, first from the auxiliary reservoir 12 and service reservoir 13 and then from the emergency reservoir 14 to the brake cylinder 16, through pipes 33 and 32, chamber 31, past the valve 29, through passage 37, chamber 48, port 52, passages 49 and 51, chamber 54, past the unseated valve 53, through passage 56, and passage and pipe 57. Simultaneously, fluid under pressure supplied into the pipe 32 acts in chamber 187a on the piston 186 of the switch device 21 and causes actuation of the contact members 188, 189, and 191 to circuit-closing position.

The circuit for energizing the electromagnet 90 of the magnet valve device 88 and the coil 195 of the circuit-maintaining relay 22 is thus completed, as previously explained, and the double beat valve 89 of the magnet valve device 88 is actuated to close off the supply of fluid under pressure from the emergency reservoir 14 to the chamber 72 and to vent the chamber 72 to atmosphere through passage 92, chamber 91 and atmospheric chamber 94. The actuation of the armature 196 of the relay 22 into engagement with the contact member 197, caused by energization of the coil of the relay 22, establishes the holding circuit, previously described, for maintaining the electromagnet 90 energized. Thus as the speed of the train decreases below the predetermined speed of sixty miles an hour, and the contact bridging member 169 accordingly disengages the contact members 179 and 181, the electromagnet 90 of the magnet valve device 88 remains energized and the chamber 72 at the one side of the valve piston 71 accordingly remains vented as long as the switch device 21 remains in circuit-closing position.

The fluid under pressure supplied through pipe 32, chamber 31 and passage 86, and acting on the inner seated area of the valve piston 71 in the chamber 73, now overcomes the tension of the spring 78 and unseats the valve piston 71 from the annular rib seat 75. Since the face of the valve piston 71 is larger than the inner seated area thereof when seated on the annular rib seat 75, the valve piston is snapped or shifted suddenly and positively to the position in which the annular rib 76 thereon seals against the gasket 77, to prevent leakage of fluid under pressure to atmosphere past the valve piston from the chamber 73. In moving to the position just described, the valve piston 71 unseats the valve 81 from the annular rib seat 82, and thus fluid under pressure is supplied from the chamber 31 through passage 86, chamber 73, past the annular rib seat 82, and into passage 51, simultaneously with the supply through the communication, previously described, past the valve 29 and through passage 49.

The tension of the spring 41 acting on the piston 38 of the inshot valve device 28 is such that when the pressure in the brake cylinder attains a predetermined degree, such as seventy-five pounds per square inch, which may correspond to the normal maximum braking ratio of one hundred and fifty per cent effected by the usual brake equipment including valve device 15 and standard capacity reservoirs 12, 13 and 14, the piston 38 is moved downwardly against the force of the spring 41 by the pressure of the fluid supplied through the passage 37 in the collar 35, and the valve 29 is thus lowered by gravity following the retraction of stem 36, into seating engagement on the annular rib seat 34, to cut off the supply of fluid under pressure to the brake cylinder by way of passage 49.

As previously indicated, the capacity of the emergency reservoir 14 is greater than that of the standard emergency reservoir and is so proportioned relative to the capacity of the brake cylinder 16 that the maximum pressure attainable in the brake cylinder 16, which is the final pressure of equalization of the emergency reservoir and the brake cylinder, is a value, such as one hundred pounds per square inch pressure which may correspond to, for example, a two hundred per cent braking ratio. Since the valve piston 71 is maintained unseated from the annular rib seat 75 by the pressure of the fluid supplied to the brake cylinder, fluid continues to be supplied to the brake cylinder 16 until the maximum pressure is attained in the brake cylinder.

The brake shoes, not shown, are thus applied to the car wheels with a force for effecting a two hundred per cent braking ratio until the speed of the train has decreased to a low degree such as ten or fifteen miles an hour, wherein the contact bridging member 169 of the governor device 19 connects the contact members 171 and 172, whereupon the electromagnet 122 of the magnet valve device 123 is energized through the circuit extending from one terminal of the battery 136 through conductor 198, switch 23, conductor 199, contact member 172, bridging member 169, contact member 171, conductor 202, movable contact member 191 of the switch device 21, conductor 201, and through electromagnet 122 of the magnet valve device 123 to ground at 138.

The valve 124 of the magnet valve device 123 is thus actuated to cut off the supply of fluid under pressure from the emergency reservoir 14 to the chamber 102 at one side of the valve piston 101 and to establish a communication, through passage 126, chamber 125 and atmospheric chamber 128, through which the fluid in the chamber 102 is vented. Brake cylinder pressure, acting through pipe and passage 57 and passage 115 on the inner seated area of the valve 110 in the valve piston 101 is thus effective to raise the valve piston 101 away from the annular rib seat 105. In view of the fact that the face of the valve piston 101 is larger than the inner seated area thereof, the valve piston is shifted suddenly and positively into the position in which the annular rib 106 thereon engages the sealing gasket 107. The valve piston 101, in moving to the position just described, carries the valve 110 away from the annular rib seat 111 and holds it unseated a sufficient distance to permit the spring 59 to seat the valve 53 on the annular rib seat 55. Thus, communication between the supply passage 51 and the passage 57 leading to the brake cylinder 16 is cut off by the valve 53 simultaneously with the connection of the passage 57 to the blow-down valve 117, past the unseated valve 110 and through the chamber 103 and passage 118.

The blow-down valve 117 is adjusted to permit the release of fluid from the brake cylinder until the pressure has been reduced to a value, such as fifty pounds per square inch, corresponding to, for example, a one hundred per cent braking ratio.

Thus, when the train has been decelerated to a relatively low speed such as fifteen miles per hour, the pressure in the brake cylinder 16 is relieved through the blow-down valve 117 and the braking ratio is accordingly reduced to a degree sufficient to bring the train to a smooth stop with no disagreeable shock or jar to the cars or passengers, and without sliding of the wheels.

If it is desired to release the brakes, after an emergency application of the brakes effected as just described, the brake pipe pressure is increased in the usual manner by operation of the brake valve device, not shown, and the brake controlling valve device 15 is accordingly conditioned to recharge the auxiliary reservoir 12, the service reservoir 13 and the emergency reservoir 14 in the usual manner and at the same time establishes communication through which the pipe 32, leading to the brake cylinder and switch device 21, is connected to atmosphere. Since the cut-off valve 53 is seated on the rib seat 55 as long as the valve piston 101 is unseated from the annular rib seat 105 by the brake cylinder pressure, fluid under pressure cannot be released past valve 53 but is vented from the brake cylinder 16 through the by-pass communication around the valve 53, that is, through passages 62 and 63, past the check valve 67, and through passage 58 to chamber 54, whence it flows through passage 51, chamber 73, passage 86 and pipe 32. Since the brake cylinder pressure was reduced through the blow-down valve 117 to a degree below that at which the piston 38 of the inshot valve device 28 is actuated to cause seating of the valve 29, the valve 29 is unseated at this time and consequently fluid under pressure is also vented from the passage 51 through passage 49, chamber 48, passage 37, chamber 31 and pipe 32.

Fluid under pressure is thus completely vented from the brake cylinder 16 and from the chamber 187a of the switch device 21, which results respectively, in the complete release of the brakes and the movement of the contact members 188, 189, and 191 of the switch device 21 to circuit-opening position. The circuits for energizing the electromagnets of the magnet valve devices 88 and 123 are thus interrupted, and the magnet valve devices are thus returned to the positions shown in Figure 1, wherein fluid under pressure is again supplied to the chambers 72 and 102 at one side of the valve pistons 71 and 101, respectively, from the emergency reservoir 14, as previously described.

If an emergency application of the brakes is initiated when the train is traveling at a speed, such as forty-five miles per hour, which is less than that sufficient to cause the contact bridging member 169 of the governor device 19 to engage the contact members 179 and 181, fluid under pressure is supplied to the brake cylinder 16, as previously described, except that no fluid flows from the chamber 31 to the passage 51 past the valve 81 in the valve piston 71, because the pressure of the fluid in the chamber 72 is maintained due to the continued deenergization of electromagnet 90 of magnet valve device 88, the valve piston 71 and the valve 81 being held seated on their respective rib seats against the force of the fluid under pressure supplied to the brake cylinder.

Accordingly, the supply of fluid under pressure to the brake cylinder is cut off, due to the seating of the valve 29 on the valve seat 34, when the degree of brake cylinder pressure attained is sufficient to move the piston 38 downwardly against the tension of the spring 41. As previously stated, the tension of the spring 41 is such that the valve 29 is seated when the brake cylinder pressure attains a degree, such as seventy-five pounds per square inch, corresponding to the maximum brake cylinder pressure attainable with present standard passenger car brake equipment.

Thus, it will be seen that for emergency applications of the brakes initiated at a time when the train speed is less than a predetermined high speed, such as sixty miles per hour, the usual maximum braking ratio of one hundred and fifty per cent effected by present standard brake equipment on passenger cars is obtained.

As in the previously described emergency application of the brakes, when the speed of a train decreases to the point where the contact bridging member 169 of the governor device 19 engages and connects the contact members 171 and 172, the electromagnet 122 of the magnet valve device 123 is energized and the double beat valve 124 is accordingly actuated to the position for venting the chamber 102 at the one side of the valve piston 101 to atmosphere. As in the previously described emergency operation, the venting of the chamber 102 at the one side of the valve piston 101 effects the simultaneous actuation of the cut-off valve 53 and the valve 110, to respectively cut off the supply communication to the brake cylinder passage 57 and to open the passage 57 to the blow-down valve 117. Thus, brake cylinder pressure is reduced to the degree determined by the setting of the blow-down valve 117 to attain the lower braking ratio at the lower speeds to prevent wheel sliding.

Release of the brakes, following an emergency application of the brakes initiated at a time when the train is traveling at a speed less than the predetermined high speed of sixty miles an hour, is effected in the same manner as previously described, by increasing the brake pipe pressure through the medium of the usual brake valve device, not shown, to condition the brake controlling valve device 15 in release or charging position.

Since the electromagnet 90 of the magnet valve device 88 was not energized, due to the fact that the train was not traveling at a sufficient speed to cause the governor device 19 to close the circuit for energizing the electromagnet 90 of the magnet valve device 88, and since the valve piston 71 accordingly remained seated on the annular rib seat 75, fluid under pressure is released from the brake cylinder to atmosphere, under control of valve device 15, as in the previously described operation, except that the passage 51 is in communication with the pipe 32 only past the unseated valve 29 of the inshot valve device 28.

If the belt 151 associated with pulley 148 of the governor device 19 breaks, or if the belt 151 disengages the pulleys 148 and 149, the governor device 19 is accordingly rendered inoperative and the spring 153 acts to open the switch device 23. Thus, the circuits for energizing the electromagnets of the magnet valve devices 88 and 123 are interrupted, and therefore, upon the initiation of an emergency application of the brakes, fluid under pressure is supplied to the brake cylinder 16 under the sole regulation of the inshot valve device 28, the maximum pressure attained in the brake cylinder being thus determined by the adjustment of the inshot valve device 28, as in the case of an emergency application of the brakes initiated at the time the train is traveling at a speed less than the predetermined high speed of sixty miles per hour.

Since the circuit for energizing the electromagnet 122 of the magnet valve device 123 is interrupted, due to the opening of the switch device 23, the chamber 102 at one side of the valve piston 101 will not be vented at the time the train speed decreases to a relatively low speed, such as ten or fifteen miles per hour, and consequently no reduction in the brake cylinder pressure through the blow-down valve 117 will occur.

It will thus be seen that in the event of the breakage of the pulley belt 151 or disengagement of the belt from the pulleys, the brake control equipment operates as does present standard passenger car brake equipment, to effect approximately a one hundred and fifty per cent braking ratio during the entire time the emergency application of the brakes is being effected. As previously noted, however, a one hundred and fifty per cent braking ratio is sufficiently low not to cause an immoderate amount of wheel sliding. The difference in braking action, due to the failure to reduce the brake cylinder pressure to the degree determined by the blow-down valve 117 at the time that the speed of the train is reduced to a relatively low speed, will indicate to the engineman that the governor device 19 is inoperative and he may then take steps to remedy this condition.

It should be understood that upon service applications of the brakes, the valve mechanism 18 and associated supplemental equipment provided according to our invention, is inoperative to effect a braking ratio higher than the usual braking ratio effected by standard passenger car brake control equipment, for service applications of the brakes.

It will be apparent that such is the case because, as is well known, the usual safety valve 207 provided on the brake controlling valve device 15 is effective upon the conditioning of the valve device 15 to effect a service application of the brakes, to limit the brake cylinder pressure to a maximum degree such as sixty-three pounds per square inch, which pressure is less than the pressure required to effect closing of the valve 29 of the inshot valve device 28 embodied in the supplemental valve mechanism 18. Consequently, since the brake cylinder pressure is limited, in service applications, by the setting of the safety valve 207, valve mechanism 18 cannot operate to effect a brake cylinder pressure and accordingly higher braking ratio, than is effected by present standard brake equipment.

The valve mechanism 18 is operative, however, in the event of a full service application of the brakes having been effected and a brake cylinder pressure, such as sixty-three pounds per square inch, which is in excess of the setting of the blow-down valve 117, having been attained. In such case, when the speed of the train decreases to the predetermined low speed, such as ten or fifteen miles per hour, at which the contact bridging member 169 of the governor device 19 connects the contact members 171 and 172 and completes the circuit for energizing the electromagnet 122 of the magnet valve device 123, chamber 102 at one side of the valve piston 101 is vented, as in an emergency application of the brakes, and the reduction in brake cylinder pressure to the degree determined by the blow-down valve 117 effected, as previously described for emergency applications of the brakes.

Referring to Figure 3, the embodiment of our invention disclosed therein differs from that shown in Figures 1 and 2 in the provision of a different type of valve mechanism in place of the valve mechanism 18 shown in Figure 1. As shown in Figure 3, the valve mechanism employed in place of the valve mechanism 18, includes a valve device 211 and a magnet valve device 212. The valve device 211 comprises three movable abutments or diaphragms 214, 215, and 216 suitably mounted in spaced coaxial relation between the separate sections of the casing 217, and secured to a stem 218 which is slidably supported in the casing. The diaphragms 214, 215, and 216 decrease successively in area, according to principles hereinafter set forth, the diaphragm 214 being larger in area than the diaphragm 215, and the diaphragm 215 being larger in area than the diaphragm 216.

At one side of diaphragm 214 is a chamber 219 having a reduced portion 221 in which operates a loose fitting guiding piston 222 formed on or secured to the stem 218. Between the diaphragms 214 and 215 is a chamber 223, and between the diaphragms 215 and 216 is a chamber 224. Between the diaphragm 216 and the casing is a chamber 225 in which is disposed a biasing means, such as a coil spring 226, which is interposed between the diaphragm 216 and the casing and which normally urges all the diaphragms, through the medium of stem 218, toward the left hand direction, as viewed in Figure 3, to cause the left end of the stem to engage and unseat a supply valve 227 from an annular rib seat 228. The supply valve 227 is adapted to control communication through a passage 234, between a chamber 229, which is in constant communication with the brake cylinder port of the brake controlling valve device 15 through a pipe 231, and a chamber 232 which is connected to the brake cylinder 16 through a pipe 233 and to chamber 225 through a pipe 266.

The valve 227 is in the form of a valve piston and is slidably mounted in a bore or chamber 230 in a screw plug 220, which closes the open end of chamber 229, a return spring 267 of relatively light tension being interposed in the chamber 230 between the valve 227 and plug 220, for urging the valve toward seated relation on the rib seat 228. Means, such as a port 250 through valve 227 or grooves in the peripheral surface of the valve, is provided in order to prevent dash-pot action of valve 227 in the chamber 230 and to establish communication between chamber 229 and chamber 230 on opposite sides of the valve 227 and thereby so equalize the fluid pressures thereon as to permit spring 267 to be effective to hold the valve 227 seated on the rib seat 228, as will be described hereinafter.

An exhaust slide valve 235, which has limited loose movement between spaced shoulders 236 and 237 on the stem 218, is provided in the chamber 232, the valve 235 normally covering an atmospheric port 238, and being adapted to be moved by the stem for controlling the exhaust of fluid under pressure from the brake cylinder 16 and chamber 232, through the atmospheric exhaust port 238.

The magnet valve device 212 comprises a pair of valve devices 239 and 240 having electromagnets 241 and 242, respectively, which are controlled in the same manner as are the electromagnets of valve devices 88 and 123, respectively, by means of governor device 19 and switch device 21.

The magnet valve device 239 comprises a pair of oppositely seating valves 243 and 244, connected by a fluted stem 245 and disposed, respectively, in an atmospheric chamber 246 and a chamber 247. A spring 248, disposed in the chamber 247 and interposed between valve 244 and a screw plug 260 which closes the chamber 247, yieldingly urges the valves 243 and 244 in a direction such that the valve 243 is normally unseated and the valve 244 is seated. Intermediate the chambers 246 and 247 is a chamber 249 which is in constant communication with the chamber 223, between the diaphragms 214 and 215, through a pipe or conduit 251. Normally, chamber 249 is in communication with the atmospheric chamber 246 past the unseated valve 243 and is cut off from chamber 247 by valve 244. Energization of electromagnet 241 causes the valves 243 and 244 to be shifted to seated and unseated positions, respectively, to cut off communication between chambers 249 and 246, and open communication between chambers 249 and 247.

The magnet valve device 240 comprises a double beat valve 253 having a fluted stem 254, the valve 253 being disposed in a chamber 255 which is in constant communication with the chamber 224, between the diaphragms 215 and 216, through a pipe or conduit 256. A spring 257, disposed in a chamber 258 into which the fluted stem 254 extends, is interposed between a collar on the end of the stem 254, and a screw plug 259 closing the chamber 258, for urging the double beat valve 253 to a position such that it establishes communication between the chamber 255 and the chamber 258, and closes communication between chamber 255 and an atmospheric chamber 265. Upon energization of electromagnet 241, the valve 253 is shifted to establish communication between chamber 255 and atmospheric chamber 265, and to cut off communication between chambers 255 and 258.

The chamber 247 of the magnet valve device 239 and the chamber 258 of the magnet valve device 240 are connected by a passage 261, which is in communication with the pipe 233 leading to the brake cylinder 16, through a pipe and passage 262 and a branch pipe 263.

The pipe 262 is connected to the switch device 21 and fluid under pressure is supplied therethrough from brake cylinder pipe 233 to cause actuation of the switch contact members 188, 189, and 191 to circuit-closing position.

In operation, the brake pipe 11 is charged with fluid under pressure by means of the usual brake valve device, not shown, and the brake controlling valve device 15 is accordingly conditioned in charging or release position to charge the auxiliary reservoir 12, the service reservoir 13, and the emergency reservoir 14 in the usual manner, while establishing communication therethrough from the brake cylinder supply pipe 231 to atmosphere.

If an emergency application of the brakes is initiated, in the usual manner, by effecting a reduction in brake pipe pressure at an emergency rate, while the train is traveling at a speed, such as one hundred miles per hour, the brake controlling valve device 15 is operated, in the usual manner, to supply fluid under pressure, first, from the auxiliary reservoir 12 and service reservoir 13, and then from the emergency reservoir 14 to the brake cylinder 16, through pipe 231, chamber 229, past the unseated supply valve 227, through passage 234, chamber 232 and pipe 233.

At the same time, fluid under pressure is supplied from pipe 233 to the switch device 21, through branch pipe 263 and pipe 262 to effect actuation of switch contact members 188, 189 and 191 of the switch device 21 to circuit-closing position, fluid under pressure being also supplied to the chamber 224, between the diaphragms 215 and 216, through pipe and passage 262, passage 261, chamber 258, past valve 253, through chamber 255 and pipe 256.

Fluid under pressure is also supplied from the slide valve chamber 232 of controlling valve device 211 to the chamber 225 through pipe 266. Also, due to the fact that the train is traveling at a speed of one hundred miles per hour which is in excess of the predetermined high speed of sixty miles per hour, the circuit for energizing the electromagnet 241 of the magnet valve device 239 is completed through the governor device 19 and the magnet valve device 239 is accordingly actuated to a position such that fluid is supplied from the pipe 262 through passage 261, chamber 247, past the unseated valve 244, chamber 249, and pipe 251 to the chamber 223, between diaphragms 214 and 215. Since the piston 222 has only a loose fit in the chamber 221, fluid under pressure flows from the chamber 232 into the chamber 219, past the piston 222.

Thus, all of the diaphragms 214, 215, and 216 are subjected on both sides to the same increasing fluid pressure, and the biasing spring 226 accordingly maintains the supply valve 227 unseated so that fluid is supplied to the brake cylinder 16 until the maximum pressure attainable is reached.

As explained above in connection with the embodiment shown in Figure 1, the emergency reservoir 14 is of greater capacity than the usual emergency reservoir employed in the standard passenger car brake equipment and is so proportioned relative to the capacity of the brake cylinder 16 that a maximum brake cylinder pressure of, for example, one hundred pounds per square inch is attained, which may correspond to a braking ratio of two hundred per cent.

When the speed of the train is decreased under the effect of the two hundred per cent braking ratio to a relatively low speed, such as ten or fifteen miles per hour, at which the governor device 19 completes the circuit for energizing the electromagnet 242 of the magnet valve device 240, the chamber 224, between the diaphragms 215 and 216, is vented to atmosphere through pipe 256, chamber 255, past the double beat valve 253 and through chamber 265. The differential force of the fluid pressure in chamber 223 acting on the diaphragm 215 and the fluid pressure in the chamber 225 acting on the diaphragm 216 accordingly becomes effective to compress the biasing spring 226 and thereby cause shifting of the stem 218 toward the right hand direction. The supply valve 227 is thus permitted to be urged into seated relation on the rib seat 228 by the spring 267 to cut off communication between the chamber 229 and the chamber 232, following which the exhaust valve 235 is shifted to uncover the exhaust port 238.

Fluid under pressure is thus vented through port 238 simultaneously from the brake cylinder 16, chamber 225, chamber 223, and chamber 219, and when a sufficient reduction in brake cylinder pressure has been thus produced, and the differential force of the fluid pressures acting on the diaphragms 215 and 216 is insufficient to overcome the spring 226, the spring 226 acts to shift the stem 218 and accordingly the exhaust valve 235 toward the left hand direction into lap position wherein the port 238 is closed to cut off further reduction in brake cylinder pressure, the stem 218 being shifted insufficiently to unseat supply valve 227 since further movement of the stem to the left is stopped as soon as reduction in brake cylinder pressure is stopped.

The relative areas of the diaphragms 215 and 216 are so designed that when the diaphragms are subjected to a differential force occasioned by a fluid pressure, of for example, fifty pounds per square inch, corresponding to a braking ratio of about one hundred per cent, the reduction in brake cylinder pressure occasioned as a result of the venting of the chamber 224, is cut off as just described.

As in the embodiment shown in Figure 1, this reduction in brake cylinder pressure and in the braking ratio, when the train speed decreases to a relatively low degree, enables a smooth stop without shock and discomfort to the passengers and also prevents sliding of the wheels.

If it is desired to release the brakes following an emergency application of the brakes effected in the manner just described, an increase in the fluid pressure in the brake pipe 11 is effected in the usual manner by means of the brake valve device, not shown, the brake controlling valve device 15 being thereupon conditioned in release or charging position wherein the auxiliary reservoir 12, the service reservoir 13 and the emergency reservoir 14 are again charged with fluid under pressure from the brake pipe 11 in the usual manner, and the pipe 231 leading to the brake cylinder 16 is connected, through the valve device 15, to atmosphere. The chamber 229 in the casing of the valve device 211 and the chamber 230 at the back of the valve piston 227, which latter chamber is connected to the chamber 229 through the port 250 in the valve piston, are thus connected to atmosphere, and when a sufficient reduction in the fluid pressure has been made, the brake cylinder pressure and the pressure of fluid in the chamber 232 acting on the inner seated area of the valve piston 227 in the passage 234 unseats the valve piston 227 from the rib seat 228 against the force of the spring 267. Fluid under pressure is thus vented from the brake cylinder to atmosphere through pipe 233, chamber 232, passage 234, chamber 229, pipe 231 and the valve device 15.

Since the electromagnets 241 and 242 of the magnet valve devices 239 and 240, respectively, remain energized as long as the switch device 21 is in circuit-closing position, the chambers 223 and 224 in the valve device 211 remain connected to the pipe 262 and to the atmospheric chamber 265, respectively. Thus, the pressure of the fluid in chamber 223 reduces simultaneously with that in the brake cylinder 16. Since chambers 219 and 225 of the valve device 211 are in constant communication with the slide valve chamber 232 of the valve device 211, the pressure of the fluid in these chambers also reduces simultaneously with that in the brake cylinder 16.

When the pressure of the fluid in chambers 223 and 225 has reduced sufficiently, the biasing spring 226 becomes effective to shift the diaphragms and the stem 218 to the left, until the left end of the stem engages and maintains the valve piston 227 in unseated relation with respect to the rib seat 228. Thus, since the spring 226 maintains the valve piston 227 unseated against the force of the spring 267, complete venting of the brake cylinder 16 and of the piston chamber in the switch device 21 is effected.

The brakes are thus completely released and the electromagnets 241 and 242 of the magnet valve devices 239 and 240, respectively, are de-energized.

In the event that an emergency application of the brakes is initiated at a time when the train is traveling at a speed, such as forty-five miles an hour, which is less than the predetermined high speed of sixty miles per hour, the electromagnet 241 of the magnet valve device 239 is not energized, due to the fact that the circuit for energizing the electromagnet is not completed through the governor device 19. Accordingly, the chamber 223, between the diaphragms 214 and 215, is vented to atmosphere through the pipe 251, chamber 249, past the unseated valve 243 and through the atmospheric chamber 246. In other respects, fluid under pressure is supplied through the pipe 231 to the brake cylinder 16, the switch device 21 and to chambers 219, 224 and 225 of the valve device 211, as in the previously described operation.

It will thus be clear that the differential force of the fluid pressure acting in chamber 219 on the diaphragm 214 and in chamber 224 on the diaphragm 215, exerts a force in opposition to the biasing spring 226 tending to move the diaphragms and the stem 218 to the right, as viewed in Figure 3.

When the pressure of the fluid supplied through pipe 231 to the brake cylinder 16 attains a degree, such as seventy-five pounds per square inch, corresponding substantially to a one hundred and fifty per cent braking ratio, the differential force of the pressures acting on the diaphragms 214 and 215 is sufficient to so compress the spring 226 and shift the stem and diaphragms in the right hand direction, as to permit seating of the valve piston 227 on the annular rib seat 228, to cut off the further supply of fluid under pressure to the brake cylinder 16. Due to the loose movement of the exhaust valve 235 between the shoulders 236 and 237 on the stem 218, the shifting of the stem 218 is insufficient at this time to cause the valve 235 to uncover exhaust port 238.

When the speed of the train has decreased to a relatively low degree, such as ten or fifteen miles per hour, under the effect of the one hundred and fifty per cent braking ratio, the circuit for energizing the electromagnet 242 of the magnet valve device 240 is completed, through the governor device 19, as in the previously described operation, and the double beat valve 253 of the magnet valve device 240 is accordingly operated to establish communication from the chamber 224, between the diaphragms 215 and 216, to the atmosphere, through pipe 256, chamber 255, and atmospheric chamber 265.

In view of the fact that the two chambers 223 and 224 are vented to atmosphere, the differential force of the fluid pressure in chamber 219 acting on the diaphragm 214 and the fluid pressure in chamber 225 acting on the diaphragm 216 becomes effective to further compress the spring 226 and to cause shifting of the stem 218 in the right hand direction to a degree such that the exhaust slide valve 235 uncovers the exhaust port 238. It will be apparent that the differential force effective as between diaphragms 214 and 216 is greater than that effective as between the diaphragms 214 and 215 for the same fluid pressure, since the diaphragm 216 is smaller in area than the diaphragm 215.

Fluid under pressure is thus released from the brake cylinder 16, the switch device 21, the chamber 219 and the chamber 225 through the port 238, and when the differential force of the fluid pressures acting on the diaphragms 214 and 216 is reduced sufficiently, spring 226 acts to shift the stem 218 and the diaphragms in the left hand direction to cause the exhaust slide valve 235 to lap or cover the exhaust port 238 and cut off further reduction in brake cylinder pressure, without however unseating the supply valve 227.

With the three diaphragms 214, 215, and 216 proportioned in area, as previously described, to effect braking ratios of one hundred and fifty per cent and one hundred per cent, it follows that since both the chambers 223 and 224 are vented to atmosphere, the tension of the biasing spring 226 is balanced with the supply valve 227 seated and the exhaust slide valve 235 in lap position when the brake cylinder pressure is reduced to substantially thirty pounds per square inch, that is, to a degree corresponding to a braking ratio of sixty per cent.

It will thus be seen that when the speed of the train is reduced to the relatively low speed of ten or fifteen miles per hour following an emergency application of the brakes initiated at the time the train was traveling at a speed less than the predetermined high speed of sixty miles an hour, the final braking ratio or brake cylinder pressure is less than the ratio or brake cylinder pressure effected when the speed of the train is reduced to ten or fifteen miles an hour following an emergency application of the brakes initiated at the time the train was traveling at a speed in excess of the predetermined high speed of sixty miles per hour.

The purpose of causing a lesser final braking ratio dependent upon whether the emergency application of the brakes was initiated at a time that the train was traveling at a speed in excess of or below a predetermined speed is to obtain substantially the same braking effect just prior to the train being brought to a complete stop, regardless of variations in the coefficient of friction between the brake shoes and the car wheels resulting from variations in the temperature thereof occasioned by application of the brake shoes to the car wheels initially at relatively high speeds or initially at relatively low speeds. As noted hereinbefore, the heat generated in the brake shoes upon an application of the brakes at high speed greatly reduces the coefficient of friction between the brake shoes and the car wheels and thus a greater braking force, that is, pressure of brake shoes against the car wheels, is necessary in order to obtain the same braking effect at the time the brake cylinder pressure is relieved to prevent sliding of the wheels, in the case of an application of the brakes initiated at a time when the train is traveling at a high speed as compared to an application of the brakes initiated at the time the train is traveling at a lower speed.

Thus, in the embodiment of my invention shown in Figure 3, variations in the coefficient of friction between the brake shoes and the car wheels occasioned by variations in the amount of heat developed in the brake shoes are automatically compensated for and a higher final braking ratio or brake cylinder pressure produced when the train is brought to a stop from a relatively high speed as compared to when the train is brought to a stop from a relatively low speed.

Release of the brakes, following an emergency application of the brakes initiated at the time the train is traveling at a speed less than the predetermined high speed of sixty miles per hour, as just described, is effected in the same manner as previously described for release of the brakes following an emergency application of the brakes initiated at the time the train is traveling at a speed in excess of the predetermined high speed, and it is therefore deemed unnecessary to specifically describe this release operation.

The embodiment shown in Figure 4, differs from the embodiment shown in Figure 3 in providing a valve device 268 in place of the controlling valve device 211, the valve device 268 differing from the valve device 211 in having only two movable abutments or diaphragms 269 and 271, of larger and smaller area, respectively, suitably mounted in the casing of the valve device and secured to the operating stem 218 for controlling the operation of the supply valve 227 and the exhaust valve 235 in a manner similar to that effected by the three diaphragms in the embodiment shown in Figure 3. While the diaphragms 269 and 271 appear to correspond in area, with that of the diaphragms 214 and 216, respectively, it should be understood that the proportions of the diaphragms 269 and 271 relatively to the diaphragms 214 and 216 may differ. Furthermore, it should be understood that a biasing spring 226a of different tension may be employed instead of the biasing spring 226 shown in the embodiment of Figure 3, although the two springs may be identical.

In the embodiment of Figure 4 the pipe 251 leading from the chamber 249 of the magnet valve device 239 is in constant communication with a chamber 273 between the diaphragms 269 and 271. Also, the pipe 256 leading from chamber 255 of magnet valve device 240 is connected to the chamber 225, there being no communication between chamber 225 and chamber 232, as through the pipe 266, shown in Figure 3.

The embodiment of Figure 4 differs from the embodiment of Figure 3 also in the provision of a blow-down or pressure valve 274 to which the chamber 265 of the magnet valve device 240 is connected through a passage 275. The blow-down valve 274 has a predetermined setting or adjustment for maintaining a predetermined pressure, the degree of which and the reason for which will be made apparent hereinafter.

Assuming that the equipment has been charged in the manner described previously in connection with the embodiment shown in Figure 3, and that an emergency application of the brakes has been initiated in the manner previously described, at the time that the train is traveling at a speed, such as one hundred miles per hour, which is in excess of the predetermined high speed of sixty miles per hour, fluid under pressure is supplied to the brake cylinder 16 through the supply pipe 231 leading from the brake controlling valve device 15, through chamber 229, past the supply valve 227, which is held unseated by the spring 226a, through the passage 234, chamber 232 and pipe 233. Since the electromagnet 242 of the magnet valve device 240 is deenergized, fluid under pressure is supplied from the pipe 233 to the chamber 225 at the right of diaphragm 271 through pipe 263, the pipe and passage 262, passage 261, chamber 258, past the valve 253, through chamber 255 and pipe 256. Furthermore, since the electromagnet 241 of the magnet valve device 239 is energized, fluid under pressure is also supplied from the pipe 233 to the chamber 273, between the diaphragms 269 and 271, through the pipe 263, pipe and passage 262, passage 261, chamber 247, past the unseated valve 244, through chamber 249 and pipe 251. As in the embodiment of Figure 3, fluid under pressure is also supplied from the chamber 232 to the chamber 219 at the left of the diaphragm 269 past the loose fitting piston 222. Thus both the sides of the diaphragms 269 and 271 are subjected to the increasing brake cylinder pressure, so that the fluid pressure forces acting on the diaphragms are balanced. The spring 226a is therefore effective to maintain the supply valve 227 unseated until the maximum pressure, as determined by the individual and relative capacities of the emergency reservoir and the brake cylinder is attained, which will effect a maximum braking ratio of, for example, two hundred per cent and corresponding to a brake cylinder pressure of one hundred pounds.

When the speed of the train has decreased to a relatively low speed, such as ten or fifteen miles per hour, governor device 19 is effective, as previously described, to complete the circuit for energizing the electromagnet 242 of the magnet valve device 240, and the chamber 225 at the right of the diaphragm 271 is accordingly connected to the blow-down valve 274 through pipe 256, chamber 255, past valve 253, through chamber 265, and passage 275, so that the pressure in chamber 225 is reduced to the degree maintained by the blow-down valve 274.

The pressure of the fluid in chamber 273 which corresponds to the brake cylinder pressure, acting on the left face of the diaphragm 271 is thus higher than the combined force of the spring 226a and the reduced pressure in chamber 225, and consequently the diaphragms 269 and 271, as well as the stem 218, are shifted in the right hand direction to first seat the supply valve 227 and then cause the exhaust valve 235 to uncover the exhaust port 238. Fluid under pressure is accordingly released from the brake cylinder 16, the chambers 219 and 273 of the valve device 268, and the piston chamber of the switch device 21, communication from the chamber 225 to chamber 258 and thus to the brake cylinder pipe 233 being cut off by the double beat valve 253 of the magnet valve device 240.

When the force of the brake cylinder pressure acting in the chamber 273 on the left face of the diaphragm 271 is reduced sufficiently by the reduction in brake cylinder pressure, the spring 226a becomes effective to shift the stem 218 and diaphragms 269 and 271 in the left hand direction so that the exhaust valve 235 covers or laps the exhaust port 238 without unseating the supply valve 227.

The pressure maintained in chamber 225 by the blow-down valve 274 is such in relation to the tension characteristics of the spring 226a and the area of the diaphragm 271, that when the brake cylinder pressure is reduced to a value, such as fifty pounds, and corresponding to a one hundred per cent braking ratio, cut-off of the exhaust of fluid under pressure from the brake cylinder through the exhaust port 238 is effected.

Thus before the train stops, the relatively high braking ratio of two hundred per cent is reduced to a braking ratio of one hundred per cent, and the train is brought to a stop smoothly and with no discomfort or shock to the passengers and without sliding of the wheels.

The release of the brakes, following an emergency application of the brakes, effected in the manner just described, is effected in the manner previously described for the embodiment shown in Figure 3, and it is deemed unnecessary, therefore, to specifically describe this operation.

In the embodiment shown in Figure 4, let it be assumed that while the train is traveling at a speed, such as forty-five miles per hour, which is below the predetermined high speed of sixty miles per hour, an emergency application of the brakes is initiated in the manner previously described. In such case, the circuit for energizing the electromagnet 241 of the magnet valve device 239 is not completed through the governor device 19, and the chamber 273 between the diaphragms 269 and 271 is accordingly connected to atmosphere through the pipe 251, chamber 249, past unseated valve 243, and through atmospheric chamber 246. As in the emergency application of the brakes previously described for the embodiment shown in Figure 4, fluid under pressure is supplied to the brake cylinder 16, the switch device 21, the chamber 225, and the chamber 219. In view of the fact that the chamber 273 is at atmospheric pressure, it will be apparent that as the brake cylinder pressure increases and as the differential force of the fluid pressure acting in chamber 219 on the diaphragm 269 and the fluid pressure in the chamber 225 acting on the diaphragm 271 increases sufficiently to overcome the tension of the spring 226a, the diaphragms and the stem 218 will be shifted in the right hand direction sufficiently to seat the supply valve 227 and cut off the further supply to the brake cylinder, without shifting the exhaust valve 235 to uncover the exhaust port 238.

The relation of the areas of the diaphragms 269 and 271 and the tension characteristics of the spring 226a are such, that when the brake cylinder pressure and accordingly the pressure of the fluid in chambers 219 and 225 attains a degree, such as seventy-five pounds per square inch, and corresponding to a braking ratio of one hundred and fifty per cent, the further supply of fluid under pressure to the brake cylinder 16 is cut off by seating of supply valve 227. It will thus be seen that when an emergency application of the brakes is initiated at a time that the train is traveling at a speed less than the predetermined high speed of sixty miles per hour, the braking ratio attained is one hundred and fifty per cent as compared to the maximum braking ratio of two hundred per cent attained when an emergency application of the brakes is initiated at a time that the train is traveling at a speed in excess of the predetermined high speed of sixty miles per hour.

The train is thus decelerated under a braking ratio of one hundred and fifty per cent until a relatively low speed such as ten or fifteen miles per hour is reached, at which time governor device 19 completes the circuit for energizing the electromagnet 242 of the magnet valve device 240.

The magnet valve device 240 is thus actuated, as previously described, to establish communication from the chamber 225 to the blow-down valve 274, and the pressure of the fluid in the chamber 225 is accordingly reduced to the degree determined by the blow-down valve 274.

The differential force of the brake cylinder pressure acting in chamber 219 on the diaphragm 269 and the reduced fluid pressure in chamber 225 acting on the diaphragm 271 thus becomes effective to further overcome the tension of the spring 226a, and the diaphragms and the stem 218 are accordingly shifted in the right hand direction sufficiently to cause the exhaust valve 235 to uncover the exhaust port 238. Fluid under pressure is accordingly vented from the brake cylinder 16 and chamber 219 through the exhaust port 238 until the pressure of the fluid is reduced to a degree insufficient to overcome the combined force of the tension of the spring 226a and the reduced fluid pressure acting in chamber 225 on the diaphragm 271, at which time the spring 226a becomes effective to shift the diaphragm and the stem 218 in the left hand direction sufficiently to cause the exhaust valve 235 to cover or lap the exhaust port 238, further reduction in brake cylinder pressure and of the pressure in chamber 219 being thereby cut off. Consequently, further movement of the diaphragm and the stem in the left hand direction is immediately stopped and unseating of the supply valve 227 is therefore not effected. The reduced pressure in the brake cylinder is thus maintained until the train is completely stopped.

As in the previously described emergency application of the brakes for the embodiment shown in Figure 4, the train is accordingly brought to a smooth stop without shock or discomfort to the passengers and without sliding of the wheels.

It should be noted that the degree to which the brake cylinder pressure is reduced at the time the train speed is reduced to ten or fifteen miles per hour, following an emergency application of the brakes initiated at a time that the train speed was less than the predetermined high speed of sixty miles per hour, is less than the degree to which the brake cylinder pressure is reduced at the time the speed of the train is reduced to ten or fifteen miles per hour, following an emergency application of the brakes initiated at a time that the train was traveling at a speed in excess of the predetermined high speed of sixty miles per hour. Obviously, the degree to which brake cylinder pressure is reduced in the two cases is determined according to the relative areas of the diaphragms 269 and 271, the ratio of brake cylinder pressures in the two cases being in inverse proportion to the ratio of the areas of the diaphragms on which the fluid pressure acts.

Thus the embodiment shown in Figure 4 is adapted to automatically compensate or differentiate as to the final brake cylinder pressure, in a manner similar to the embodiment shown in Figure 3, depending upon the speed with which the train was traveling at the time the emergency application of the brakes was initiated, allowance for variations in the coefficient of friction between the brake shoes and the car wheels, occasioned by variations in the heat developed in the brake shoes, being accordingly automatically effected.

Release of the brakes, following an emergency application of the brakes initiated at the time the train is traveling at a speed less than the predetermined high speed of sixty miles per hour, in the embodiment shown in Figure 4, being similar to that described for the embodiment shown in Figure 3, it is deemed unnecessary to specifically describe this operation.

As is the case in the embodiment shown in Figure 1, wherein the supplemental valve mechanism 18 is inoperative to effect a braking ratio higher than the usual braking ratio effected by the standard passenger car brake control equipment for service applications of the brakes, so also are the valve devices 211 and 268, of the embodiments shown in Figures 3 and 4 respectively, inoperative to effect a braking ratio higher than the usual braking ratio for service applications of the brakes, effected by standard passenger car brake control equipment. It will be apparent that such is the case because the springs 226 and 226a of the valve devices 211 and 268, respectively, are so tensioned as to maintain the supply valve 227 unseated until a brake cylinder pressure of at least seventy-five pounds per square inch has been attained upon an application of the brakes. Since, as previously explained in connection with the embodiment shown in Figure 1, the safety valve 207 associated with the brake controlling valve device 15 functions during a service application of the brakes to limit the brake cylinder pressure to a maximum degree of sixty-three pounds per square inch, it follows that whether the service application of the brakes is initiated at the time the train is traveling at a speed in excess of or below the predetermined high speed of sixty miles per hour, the maximum brake cylinder pressure attainable is that determined by the safety valve 207.

Also, similarly to the valve mechanism 18 shown in Figure 1, the valve devices 211 and 268 function during a full service application of the brakes to reduce brake cylinder pressure at the time the speed of the train is reduced to a relatively low speed such as ten or fifteen miles per hour, the degree to which the brake cylinder pressure is reduced to prevent sliding of the wheels being different however, depending upon the speed of the train being above or below the predetermined speed of sixty miles per hour at the time that the service application of the brakes is initiated.

In the event of breakage of the driving belt 151 of the governor device 19 or disengagement of the belt 151 from the associated pulleys, and the consequent opening of the switch device 23 as previously described, the electromagnet of the magnet valve device 212, in the embodiments shown in Figures 3 and 4, remains deenergized. Thus, upon the initiation of an emergency application of the brakes at a time that the train is traveling in excess of the predetermined high speed of sixty miles per hour, the controlling valve devices 211 and 268 function to cut off the supply of fluid under pressure to the brake cylinder 16 when a pressure of seventy-five pounds per square inch and corresponding to a braking ratio of one hundred and fifty per cent is attained. In such case, therefore, the usual braking ratio of one hundred and fifty per cent effected by standard passenger car equipment is attained. Furthermore, since no variation in the fluid pressure on the differential diaphragm valve devices 211 and 268 is effected at the time the speed of the train reduces to the relatively low speed of ten or fifteen miles per hour, the full braking ratio of one hundred and fifty per cent is maintained until the train is brought to a complete stop. Thus in the event of the opening of the switch device 23, the embodiments shown in Figures 3 and 4 function to produce the same braking effect as does present standard passenger car brake equipment.

In the event of a service application of the brakes being initiated at a time when the switch device 23 is open, the valve devices 211 and 268 of the embodiments, shown in Figures 3 and 4 respectively, are likewise inoperative to effect any reduction in brake cylinder pressure at the time the speed of the train is reduced to the relatively low degree of ten or fifteen miles per hour, because the magnet valve device 240 is not energized and therefore no variation in the fluid pressure acting on the diaphragms of the valve devices 211 and 268 is effected.

The embodiment of our invention shown in Figure 5, differs from the embodiment shown in Figure 1 in the provision of a different type of valve mechanism 281 in place of the valve mechanism 18.

The valve mechanism 281 comprises, essentially, a pair of magnet valve devices 282 and 283, respectively, embodied in a casing 284 and having a pair of blow-down valves 285 and 286 associated with the magnet valve devices 282 and 283, respectively. The magnet valve device 282 comprises an electromagnet 288, and a valve 289 actuated by the electromagnet 288. The valve 289 is disposed in a chamber 291 which is in constant communication with the blow-down valve 285 through a passage 292 and has a fluted stem 293 which extends through a bore 294 into a chamber 295. A coil spring 296, disposed in the chamber 295 and interposed between a collar or flange on the fluted stem 293 and a screw plug 297 closing the chamber 295, normally yieldingly urges the valve 289 away from its associated valve seat 298 to open communication between the chamber 295 and the chamber 291. Upon energization of the electromagnet 288 the valve 289 is actuated into seated position on the valve seat 298 to close communication between the chamber 295 and the chamber 291, against the force of the spring 296.

The magnet valve device 283 comprises an electromagnet 301 and a valve 302 actuated by the electromagnet 301. The valve 302 is disposed in a chamber 303 which is in constant communication with the chamber 295 of the magnet valve device 282 through a passage 304, and is normally yieldingly urged into seated relation on its associated valve seat 305 by a coil spring 306, disposed in the chamber 303 and interposed between the valve and a screw plug 307 which closes the chamber 303. Upon energization of the electromagnet 301, the valve 302 is unseated from its valve seat against the force of the spring 306, and communication is thereby established from chamber 303 to a chamber 309 through a bore 311 through which the fluted stem 300 of the valve extends. The chamber 309 is in constant communication with the blow-down valve 286 through a passage 312.

The brake cylinder 16 is supplied with fluid under pressure from the brake cylinder port of brake controlling valve device 15 through a pipe 314, the switch device 21 also being supplied with fluid under pressure through a branch pipe 315 opening out of the pipe 314, the pipe 314 being connected also to the passage 304 of the valve mechanism 281 through a branch pipe 316.

The electromagnets 288 and 301 of the valve mechanism 281 are controlled, respectively, in the same manner as are the electromagnets 90 and 122 of the valve mechanism 18 shown in Figure 1, the circuit for energizing the electromagnet 288 being completed through the governor device 19 and the contact members of the switch device 21 upon an application of the brakes initiated at the time the train is traveling at a speed in excess of the predetermined high speed of sixty miles per hour, and the circuit for the electromagnet 301 being completed through the governor device 19 and contact members of the switch device 21 whenever the speed of a train reduces to a relatively low degree, such as ten or fifteen miles per hour, following the initiation of an application of the brakes, whether the speed of the train at the time of the initiation of an emergency application of the brakes is in excess of or less than the predetermined high speed of sixty miles per hour.

Assuming the auxiliary reservoir 12, the service reservoir 13 and the emergency reservoir 14 to be charged as described in the previously described embodiments, and assuming that the train is traveling at a speed in excess of the predetermined high speed of sixty miles per hour, fluid under pressure is supplied to the brake cylinder 16, upon the initiation of an emergency application of the brakes, under the control of the brake controlling valve device 15, through the pipe 314, the switch device 21 being simultaneously actuated to circuit-closing position by fluid under pressure supplied through the pipe 315.

Since the train is traveling at a speed in excess of the predetermined high speed of sixty miles per hour, the electromagnet 288 of the magnet valve device 282 is energized and the valve 289 is accordingly actuated into seated position on the valve seat 298. Accordingly, fluid under pressure is supplied to the brake cylinder 16 until the maximum degree of pressure, such as one hundred pounds per square inch and corresponding to a two hundred per cent braking ratio, is attained.

When the speed of the train is decreased to the relatively low speed, such as ten or fifteen miles per hour, the circuit for energizing the electromagnet 301 of the magnet valve device 283 is completed through the governor device 19, and the valve 302 is accordingly unseated from its valve seat 305 to establish communication from the brake cylinder 16 to the blow-down valve 286 through pipe 314, branch pipe 315, passage 304, chamber 303, past the unseated valve 302, through bore 311, chamber 309 and passage 312.

The setting of the blow-down valve 286 may be such that the brake cylinder pressure is reduced to any desired degree, such as fifty pounds per square inch, corresponding to a braking ratio of one hundred per cent.

Thus as the speed of the train is decreased to a relatively low speed and just prior to stopping of the train, the braking ratio is decreased from the relatively high braking ratio of two hundred per cent to a braking ratio of one hundred per cent, so that the train is brought to a stop smoothly and with no sliding of the wheels or shock and discomfort to the passengers.

Release of the brakes following an emergency application of the brakes, as just described, being effected similarly as in previously described embodiments, it is deemed unnecessary to specifically describe this operation.

If an emergency application of the brakes is initiated at a time when the train is traveling at a speed less than the predetermined high speed of sixty miles per hour, fluid under pressure is supplied to the brake cylinder 16 and to the switch device 21, as in the previously described emergency application of the brakes. However, the speed of the train being insufficient, the circuit for energizing the electromagnet 288 of the magnet valve device 282 is not completed through the governor device 19 and therefore, valve 289 remains unseated from its valve seat 298 and the ultimate fluid pressure attained in the brake cylinder 16 is accordingly determined by the setting of the blow-down or safety valve 285, the brake cylinder 16 being in communication with the blow-down or safety valve 285 through pipe 314, branch pipe 316, passage 304, chamber 295, bore 294, past the unseated valve 289, through chamber 291, and passage 292.

The setting of the safety valve 285 is such as to maintain a pressure in the brake cylinder, such as seventy-five pounds per square inch, and corresponding to a one hundred and fifty per cent braking ratio. It will thus be seen, that when an emergency application of the brakes is initiated at a time when the train is traveling at a speed less than the predetermined high speed of sixty miles per hour, the brake cylinder pressure is limited to a degree, such as seventy-five pounds per square inch, which corresponds to a braking ratio less than the braking ratio attained upon an emergency application of the brakes initiated at a time when the train is traveling at a speed in excess of the predetermined high speed of sixty miles per hour.

As the speed of the train decreases to a relatively low degree, such as ten or fifteen miles per hour, the circuit for energizing the electromagnet 301 of the magnet valve device 283 is completed through the governor device 19, and, as in the previously described emergency application of the brakes for the embodiment shown in Figure 5, communication is thus established from the brake cylinder 16 to the blow-down valve 286. Brake cylinder pressure is accordingly reduced to the same degree of pressure determined by the adjustment of the blown-down valve 286, as in the case of an emergency application of the brakes initiated at the time the train travels at a speed in excess of the predetermined high speed of sixty miles per hour. As in the previous case, this reduction in the brake cylinder pressure prior to stopping of the train enables a smooth stop without sliding of the wheels.

Release of the brakes, following an emergency application of the brakes initiated at a time when the train is traveling at a speed less than the predetermined high speed of sixty miles per hour, being effected similarly as in previously described operations or embodiments, it is deemed unnecessary to specifically describe this operation.

The embodiment of our invention, shown in Figure 6, differs essentially from the embodiment shown in Figure 5, in the provision of a valve mechanism 321 in place of the valve mechanism 281, whereby the brake cylinder pressure is controlled, according to the speed of the train, indirectly by magnet valve devices through the medium of relay valve devices, controlled by the magnet valve devices, so as to obviate the condition present in the embodiment shown in Figure 5 wherein the magnet valve devices directly control the brake cylinder pressure according to the speed of the train.

The valve mechanism 321 comprises a magnet valve casing section 322 and a relay valve casing section 323, suitably secured together, by bolts or screws, not shown, and having gaskets 324 and 325 interposed therebetween.

Operating in a bore 328 in the casing section 323 is a valve piston 329, similar to the valve pistons 71 and 101 of the embodiment shown in Figure 1, the valve piston 329 having at one side a chamber 331 and at the opposite side a chamber 332. Inset in one face of the valve piston 329 is an annular gasket 333 which is adapted to seat on an annular rib seat 334 which is smaller in diameter than is the bore 328, the valve piston 329 being urged into seated relation on the annular rib seat 334 by a coil spring 335 which is interposed in the chamber 331 between the valve piston 329 and the casing section 322. Formed on the face of the valve piston 329 opposite to that having the annular gasket 333 is an annular rib 336 which is adapted to seat in sealing relation against the gasket 324 when the valve piston 329 is moved away from the annular rib seat 334.

Formed in the face of the valve piston 329 open toward the chamber 332 is a chamber or recess 338, a disc type valve 339 being guidably mounted in the chamber 338 and yieldingly urged outwardly of the chamber 338 by a coil spring 341 which is interposed in the chamber 338 between the valve 339 and the valve piston 329. When the valve piston 329 is seated on the rib seat 334 the valve 339 is yieldingly held in seated relation on an annular rib seat 342 and cuts off or closes communication from the chamber 332 to atmosphere through an atmospheric port or passage 343. A threaded collar 344, screwed into the valve piston 329 at the open end of the chamber 338, serves to engage the guide lugs of the valve 339 and effect unseating of the valve 339 from the annular rib seat 342 upon movement of the valve piston 329 away from the annular rib seat 334.

The brake cylinder 16 is in communication with the chamber 332 at the one side of the valve piston 329, through pipe 314, a branch pipe 346, a loaded check valve device 347 and a passage 348. The check valve device 347 comprises a ball check valve 401, a loading spring 402 for urging the valve 401 to its associated seat, and an adjusting screw 403 for varying the tension of spring 402.

A magnet valve device 351 is provided for controlling the supply of fluid under pressure to and the release of fluid under pressure from the chamber 331 at one side of the valve piston 329. The magnet valve device 351 comprises an electromagnet 353 and a pair of oppositely seating valves 354 and 355, the valves being connected by a fluted stem 356 and simultaneously actuated by the electromagnet 353. The valve 354 is disposed in an atmospheric chamber 357, and the valve 355 is disposed in a chamber 358 which is in constant communication with a source of fluid supply, such as the emergency reservoir 14, through a pipe 359. A coil spring 361, disposed in the chamber 358 and interposed between the valve 355 and a screw plug 362 closing the chamber 358, normally yieldingly urges the valve 355 into seated relation on its associated valve seat and unseats the valve 354 from its associated valve seat.

Intermediate the chambers 357 and 358 is a chamber 363, which is in constant communication with the chamber 331 at the one side of the valve piston 329 through a passage 364, communication between the chamber 363 and the atmospheric chamber 357 being established past the unseated valve 354 in the normal position of the valves 354 and 355, and communication being cut off between the chamber 363 and the chamber 358 by the valve 355. When the electromagnet 353 is energized, communication is opened from the chamber 363 to the chamber 358 past the unseated valve 355, communication of chamber 363 with the chamber 357 being simultaneously cut off by valve 354.

A valve piston 367 is also provided which operates in a bore 368 in the casing section 323 and which has a chamber 369 at one side thereof and a chamber 371 at the opposite side thereof. Inset in one face of the valve piston 367 is an annular gasket 372 which is adapted to seat on an annular rib seat 373 into which position the valve piston is yieldingly urged by a coil spring 374, disposed in the chamber 369 and interposed between the valve piston 367 and the casing section 322. An annular rib 375 is provided on the face of the valve piston open to the chamber 369, which rib is adapted to engage the gasket 325 in sealing relation, when the valve piston 367 is moved to the opposite extremity of its travel away from the annular rib seat 373.

Guidably mounted in a recess or chamber 376 in the face of the valve piston 367 open to the chamber 371 is a disc type valve 377 which is yieldingly urged outwardly of the chamber 376 by a coil spring 378 interposed in the chamber 376 between the valve 377 and the valve piston 367. When the valve piston 367 is seated on the annular rib seat 373 the valve 377 is yieldingly held seated on an annular rib seat 379 to cut off communication between the chamber 371 and an atmospheric exhaust passage or port 381. A threaded collar 383, screwed to the valve piston 367 at the outer end of the chamber 376, is adapted to engage the guide lugs on the valve 377 and unseat valve 377 from the annular rib seat 379, when the valve piston 367 is moved away from the annular rib seat 373.

The brake cylinder 16 is in communication with the chamber 371 through pipes 314 and 346, a branch pipe 385, past a loaded check valve device 386 and through a passage 387. The check valve device 386 is similar to the check valve device 347 and comprises a ball check valve 405, a loading spring 406 for the valve 405, and an adjusting screw 407, the degree of loading of the valve 405 being less than that of the check valve 401, as will be explained hereinafter.

A magnet device 388 is provided for controlling the supply of fluid under pressure to and the release of fluid under pressure from the chamber 369 at the one side of the valve piston 367. The magnet valve device 388 comprises an electromagnet 389, and a double beat valve 391 which is actuated by the electromagnet 389 and which is disposed in a chamber 392 constantly connected to chamber 369 through a passage 393. The double beat valve has a fluted stem 394 which extends into a chamber 395, and a coil spring 396, contained in the chamber 395 in interposed relation between a collar or flange on the end of the fluted stem 394 and a screw plug 397 which closes the chamber 395, yieldingly urges the double beat valve 391 into a position such that communication is established from the chamber 392 to the chamber 395. The chamber 395 is in constant communication with the chamber 358 of the magnet valve device 351, through a passage 398.

Upon energization of the electromagnet 389, the double beat valve 391 is shifted to a position such that the communication between the chamber 392 and the chamber 395 is cut off and a communication is established from the chamber 392 to an atmospheric chamber 399.

The electromagnets 353 and 389 are controlled, respectively, in the same manner as are the electromagnets 288 and 301 of the embodiment shown in Figure 5, by the governor device 19 and the switch device 21.

Assuming the brake pipe 11, the auxiliary reservoir 12, the service reservoir 13 and the emergency reservoir 14 to have been charged, as previously described, the equipment being conditioned as shown in Figure 6, and that an emergency application of the brakes is initiated at the time the train is traveling at a speed in excess of the predetermined high speed of sixty miles per hour, fluid under pressure is supplied through pipe 314 to the brake cylinder 16 and the switch device 21.

The electromagnet 353 of the magnet valve device 351 having been energized by actuation of the switch device 21 to circuit-closing position, as before described, the magnet valve device 351 is actuated to the position for supplying fluid under pressure from the emergency reservoir 14 to the chamber 331 through pipe 359, chamber 358, past the unseated valve 355, through chamber 363, and passage 364. Thus both the fluid under pressure in chamber 331 and the tension of the spring 335 act to maintain the valve piston 329 seated on the annular rib seat 334.

When the brake cylinder pressure has been built up sufficiently to unseat the ball valve 401 of the check valve device 347 against the tension of the loading spring 402, fluid under pressure is supplied from the brake cylinder supply pipe 314, through the pipe 346, past the valve 401, and through passage 348 to the chamber 332, where it tends to unseat the valve piston 329 from the annular rib seat 334. However, since a relatively high emergency reservoir pressure is acting on the opposite face of the valve piston, the valve piston 329 is maintained in seated relation on the annular rib seat 334, against the brake cylinder pressure. Thus, due to the tension of the spring 341 and the pressure of the fluid which flows past the valve 339 into the chamber 338, the valve 339 is held tightly against the annular rib seat 342 and exhaust of fluid under pressure from the chamber 332 and accordingly from the brake cylinder 16 is prevented.

As will be explained hereinafter, the check valve device 347 is adjusted so as to require a pressure in excess of a predetermined degree, such as seventy-five pounds per square inch and corresponding to a braking ratio of one hundred and fifty per cent, in order to permit flow of fluid under pressure therepast.

In view of the fact that the maximum pressure attainable in the brake cylinder 16 is as previously explained, a degree substantially higher than that determined by the check valve device 347, namely, a maximum pressure of, for example, one hundred pounds per square inch, and corresponding to a braking ratio of two hundred per cent, and since despite the unseating of the check valve device 347 fluid under pressure is prevented from escaping past the valve 339 and through the exhaust port 343 of the brake cylinder 16, the brake cylinder pressure is built up to the maximum degree, that is for example, to one hundred pounds per square inch and corresponding to the maximum braking ratio of two hundred per cent.

The electromagnet 389 of the magnet valve device 388 being deenergized at this time, the supply of fluid under pressure from the emergency reservoir 14 to the chamber 369 at the one side of the valve piston 367 is maintained through pipe 359, chamber 358, passage 398, chamber 395, past valve 391, through chamber 392 and passage 393. Thus brake cylinder pressure acting in chamber 371 on the face of the valve piston 367, through the pipe 385, past the loaded check valve 405 and through passage 387, is ineffective to unseat the valve piston 367 from the annular rib seat 373 and reduction in brake cylinder pressure by venting of fluid under pressure past the loaded check valve device 386 is prevented because the valve 377 is maintained seated on the annular rib seat 379.

Thus the two hundred per cent braking ratio is effective to decelerate the train from the high speed in excess of the predetermined high speed of sixty miles per hour until the speed of the train is decreased to a relatively low degree, such as ten or fifteen miles per hour, at which time the governor device 19 completes the circuit for energizing the electromagnet 389 of the magnet valve device 388. The double beat valve 391 is accordingly actuated to cut off the communication through which fluid is supplied from the emergency reservoir 14 to the chamber 369 and to open communication from the chamber 369 to the atmospheric chamber 399 to vent fluid under pressure from the chamber 369.

The brake cylinder pressure acting in chamber 371 on the face of the valve piston 367 thus becomes effective to overcome the tension of the spring 374 and, upon unseating of the valve piston 367 from the annular rib seat 373, the entire face of the valve piston is subjected to brake cylinder pressure which then causes the valve piston 367 to be suddenly shifted or snapped to the opposite extremity or position in the bore 368, in which position the annular rib 375 seals against the gasket 325 to prevent leakage of fluid under pressure past the valve piston 367 from the chamber 371 to the chamber 369 and to atmosphere.

The ball check valve 405 of check valve device 386 is loaded by the spring 406 to any desired degree, such as fifty pounds per square inch, corresponding for example to a one hundred per cent braking ratio. Thus when the valve 377 in the valve piston 367 is unseated from the annular rib seat 379 by movement of the valve piston 367 to its upper position as just described, fluid under pressure is vented from the brake cylinder through pipes 314 and 346, branch pipe 385, past the check valve device 386, through passage 387, chamber 371, past the unseated valve 377, and through the exhaust port or passage 381. When the pressure of fluid in the brake cylinder has been reduced to a degree slightly below the adjustment of the check valve device 386, the ball check valve 405 of the check valve device 386 is urged by the loading spring 406 into seated relation on its valve seat to cut off further release of fluid under pressure from the brake cylinder.

Thus, at the time the train speed is reduced to a relatively low degree, the braking ratio is reduced from a relatively high degree of two hundred per cent to a relatively low degree of one hundred per cent, and as in previous instances, the train is brought to a smooth stop with no shock or discomfort to the passengers and without sliding of the wheels.

Release of the brakes following an emergency application of the brakes effected in the manner just described, is effected in a manner similar to that described in previous embodiments, and it is deemed unnecessary, therefore, to specifically describe this operation.

If an emergency application of the brakes is initiated at a time that the train is traveling at a speed less than the predetermined high speed of sixty miles per hour, the circuit for energizing the electromagnet 353 of the magnet valve device 351 is not completed through the governor device 19, and consequently, the chamber 331 at the one side of the valve piston 329 is connected to atmosphere through the passage 364, chamber 363, past the unseated valve 354, and through the atmospheric chamber 357. Thus fluid under pressure is supplied to the brake cylinder 16, as in the previously described emergency application of the brakes, until pressure of the fluid unseats the ball check valve 401 of the loaded check valve device 347, which as previously explained, is adjusted to maintain a pressure such as seventy-five pounds per square inch, corresponding to a braking ratio of one hundred and fifty per cent. The supply of fluid under pressure past the check valve device 347 to chamber 332 through the passage 348 then becomes effective to suddenly and positively shift the valve piston 329 away from the annular rib seat 334 against the tension of the spring 335 into the position wherein the annular rib 336 seals against the gasket 324. In moving to this position, the threaded collar 344 on the valve piston 329 engages the guide lugs on the disc valve 339 and unseats the valve 339 from the annular rib seat 342 so that the passage 348 is connected to atmosphere through the chamber 332, past the unseated valve 339, and through the atmospheric exhaust passage 343.

It will, therefore, be seen that the pressure of the fluid supplied to the brake cylinder 16 cannot exceed the degree of pressure as determined by the loaded check valve device 347, because excess pressure is immediately relieved through the atmospheric exhaust passage 343.

Thus, when an emergency application of the brakes is initiated at a time when the train is traveling at a speed less than the predetermined high speed of sixty miles per hour, a braking ratio of one hundred and fifty per cent is attained as compared to a braking ratio of two hundred per cent attained when an emergency application of the brakes is initiated at a time that the train is traveling at a speed in excess of the predetermined high speed.

As in the previously described emergency application of the brakes, the valve piston 367 is held seated on the annular rib seat 373 by the pressure of the fluid supplied to the chamber 369 from the emergency reservoir 14 through pipe 359, chamber 358, passage 398, chamber 395, past valve 391, through chamber 292, and passage 393. Accordingly, the valve 377 is held seated on the annular rib seat 379 to prevent exhaust of fluid under pressure from the brake cylinder past the check valve device 386.

The speed of the train is reduced, under a braking ratio of one hundred and fifty per cent, until the relatively low speed, such as ten or fifteen miles per hour is reached, at which time the circuit for energizing the electromagnet 389 of the magnet valve device 388 is completed through the governor device 19. The double beat valve 391 of the magnet valve device 388 is accordingly shifted to cut off the supply of fluid under pressure to the chamber 369 at the one side of the valve piston 367 and to establish communication through which the fluid under pressure in the chamber 369 is vented to atmosphere.

The loaded check valve device 386 being adjusted to maintain a pressure, such as fifty pounds per square inch, and corresponding to a braking ratio of one hundred per cent as previously explained, fluid under pressure is released from the brake cylinder 16 through pipes 314 and 346, branch pipe 385, past the check valve device 386 through passage 387, chamber 371, past the unseated valve 377, and through the exhaust passage 381, until reduced sufficiently to cause reseating of the check valve 405 of check valve device 386.

Thus, a short interval before the train is brought to a stop, the braking ratio of one hundred and fifty per cent is reduced to a braking ratio of one hundred per cent, and as in previous cases, the train is accordingly brought to a smooth stop without shock or discomfort to the passengers and without sliding of the wheels.

Release of the brakes, following an emergency application of the brakes initiated at a time that train is traveling at a speed less than the predetermined high speed of sixty miles per hour, is effected as in previously described embodiments, and it is therefore deemed unnecessary to specifically describe this operation.

It will be noted that the embodiments shown in Figures 5 and 6 function during a service application of the brakes in the manner above described in connection with the embodiment shown in Figure 1. Since the blow-down valve 285 of the valve mechanism 281 and the loaded check valve device 347 of the valve mechanism 321 are adjusted to relieve pressure only at a degree such as seventy-five pounds per square inch, which is in excess of the usual sixty-three pound setting of the safety valve 207 associated with the brake controlling valve device 15, the maximum brake cylinder pressure attainable during a service application of the brakes is that determined by the setting of the safety valve 207. Thus, both the valve mechanism 281 and the valve mechanism 321 are ineffective to produce a braking ratio higher than the usual braking ratio effected by present standard braking equipment on passenger cars during a service application of the brakes.

Since the blow-down valve 286 of the valve mechanism 281 and the loaded check valve device 386 of the valve mechanism 321 are set to maintain a pressure, such as fifty pounds, which is less than the sixty-three pound per square inch pressure maintained by the safety valve 207 of the brake controlling valve device 15, the valve mechanisms 281 and 321 both function, during a full service application of the brakes, to reduce the brake cylinder pressure to fifty pounds per square inch at the time the speed of the train reduces to a relatively low speed, such as ten or fifteen miles per hour.

It will also be noted that, as in the embodiment shown in Figure 1, the normal braking ratio of one hundred and fifty per cent which is obtained by present standard brake equipment, is attained in the case of the embodiments shown in Figures 5 and 6 during an emergency application of the brakes, regardless of the speed of the train being above or below the predetermined high speed of sixty miles per hour, in the event that the switch device 23 is opened due to breakage of the driving belt 151 of the governor device 19 or disengagement of the driving belt 151 from the pulleys with which it is associated. It will be apparent that such is the case because the blow-down valve 285 of the valve mechanism 281 and the loaded check valve device 347 of the valve mechanism 321 are respectively effective to limit the maximum degree of brake cylinder pressure attainable, in such case, to the usual degree, such as seventy-five pounds per square inch and corresponding to the usual braking ratio of one hundred and fifty per cent.

It will also be apparent that since the electromagnets of the magnet valve devices of the valve mechanisms 281 and 321 cannot be energized with the switch device 23 in open position, no reduction in brake cylinder pressure to the degree determined by the blow-down valve 286 or the loaded check valve device 386 can occur, in such case, when the speed of the train is reduced to the low speed of ten or fifteen miles per hour. Consequently, with the switch device 23 in open position, the braking equipment functions in all respects as does the present standard braking equipment for passenger cars.

It should be understood that the various train speeds, brake cylinder pressures, and braking ratios mentioned herein are merely illustrative and are employed merely for the sake of assisting in the comprehension of the operating characteristics of the embodiments disclosed. Obviously, these factors may vary from the illustrative figures used herein without departing from the spirit of the invention.

Summarizing, it will be seen that we have provided brake control equipment for high speed service, which equipment is adapted to automatically effect a higher brake cylinder pressure and an accordingly higher braking ratio if an emergency application of the brakes is initiated at a time that the train is traveling at a speed in excess of a predetermined high speed, than if an emergency application of the brakes is initiated at a time that the train is traveling at a speed less than the predetermined high speed.

It will also be seen that we have provided brake control equipment for automatically reducing the brake cylinder pressure and consequently the braking ratio when the speed of the train is reduced to a relatively low degree, during both service and emergency applications of the brakes.

It will also be seen that we have provided brake control equipment which functions to reduce the brake cylinder pressure and consequently the braking ratio to a lesser value at the time the speed of the train is reduced to a relatively low degree if the application of the brakes is initiated at a time the train is traveling at a speed less than a predetermined high speed, as compared to the value to which the brake cylinder pressure is reduced if the application of the brakes is initiated at a time that the train is traveling at a speed in excess of the predetermined high speed. Thus, substantially the same braking effect is thereby produced at the lower speeds in each case, regardless of the variations in the coefficient of friction between the brake shoes and the car wheels occasioned by varying degrees of heating of the brake shoes.

It will be seen, further, that we have provided supplemental control equipment adapted to be employed in association with present standard brake control equipment for passenger cars, which supplemental equipment adapts the present standard brake equipment for use in high speed service by enabling higher brake cylinder pressures and braking ratios to be obtained than in the case of the present standard brake equipment.

While we have disclosed only five embodiments of our invention, it should be apparent that various omissions, additions and modifications may be effected without departing from the spirit of our invention. It is not our intention, therefore, to limit the scope of our invention except as necessitated by the prior art and as defined in the appended claims.

Having now described our invention, what we claim as new and desire to secure by Letters Patent, is:

1. In a fluid pressure operated vehicle brake system, in combination, a brake cylinder, a brake controlling valve device operative to cause fluid under pressure to be supplied to and released from the brake cylinder and thereby effect, respectively, the application and release of the brakes, a speed-responsive device operated in accordance with the speed of the vehicle, means controlled by the speed-responsive device for controlling the degree of the brake cylinder pressure initially attained upon the initiation of an application of the brakes, and means for rendering the pressure controlling means ineffective to cause a reduction from the initial brake cylinder pressure, as the speed of the vehicle decreases, until a substantial decrease in vehicle speed occurs.

2. In a fluid pressure operated vehicle brake system, in combination, a brake cylinder, a brake controlling valve device operative to cause fluid under pressure to be supplied to and released from the brake cylinder and thereby effect, respectively, the application and release of the brakes, independent means for controlling the degree of the brake cylinder pressure initially attained upon the initiation of an application of the brakes, a speed responsive device operated in accordance with the speed of the vehicle for controlling said independent means, and means for rendering the speed-responsive device ineffective to control the independent means to cause reduction from the initial brake cylinder pressure as the speed of the vehicle decreases, until a substantial decrease in vehicle speed occurs.

3. In a fluid pressure operated vehicle brake system, in combination, brake controlling means operative to effect the application and release of the brakes, means independent of the brake controlling means effective upon the initiation of an application of the brakes when the vehicle is traveling at less than a predetermined speed for limiting the force of the brake application to a degree less than that effected upon the initiation of an application of the brakes when the vehicle is traveling in excess of said predetermined speed, and means for preventing said last means from effecting a reduction in the initially established braking force when the speed of the vehicle decreases from above to below the said predetermined speed.

4. In a fluid pressure operated vehicle brake system, in combination, brake controlling means operative to effect the application and release of the brakes, means effective to limit the degree of the braking force with which an application is initially effected, to a degree less than the maximum degree of braking force attainable, a speed-responsive device operated according to the speed of the vehicle, means controlled by the speed-responsive device and effective when the vehicle is traveling in excess of a predetermined speed for rendering the force limiting means ineffective to limit the initial degree of the braking force with which an application is effected, and means for rendering the speed-responsive device ineffective to cause a reduction from the maximum degree of braking force, as the speed of the vehicle decreases from above to below the said predetermined speed, until the vehicle speed decreases a substantial amount below the said predetermined speed.

5. In a fluid pressure operated vehicle brake system, in combination, a brake cylinder, a brake controlling valve device operative to cause fluid under pressure to be supplied to or released from the brake cylinder to effect the application and release, respectively, of the brakes, means independent of the brake controlling valve device effective upon the initiation of an application of the brakes when the vehicle is traveling less than a predetermined speed for limiting the degree of the brake cylinder pressure initially attained to a value less than the degree of brake cylinder pressure initially attained upon the initiation of an application of the brakes when the vehicle is traveling in excess of said predetermined speed, and means for rendering the last said means ineffective to cause a reduction in brake cylinder pressure, as the speed of the vehicle reduces from above to below said predetermined speed, until a substantial decrease in vehicle speed below the predetermined speed occurs.

6. In a fluid pressure operated vehicle brake system, in combination, a brake cylinder, a brake controlling valve device operative to cause fluid under pressure to be supplied to or released from the brake cylinder to effect the application and release, respectively, of the brakes, means effective to limit the degree of brake cylinder pressure initially attained upon an application of the brakes to a value less than the maximum degree of brake cylinder pressure attainable, a speed-responsive device operated according to the speed of the vehicle, means controlled by the speed-responsive device and effective upon the initiation of an application of the brakes at a time when the vehicle is traveling in excess of a predetermined speed for rendering the pressure limiting means ineffective to limit the degree of the brake cylinder pressure initially attained, and means for preventing the speed-responsive device from causing a reduction from the maximum degree of brake cylinder pressure, as the vehicle speed reduces below the predetermined speed, until a substantial decrease in vehicle speed below the predetermined speed occurs.

7. In a fluid pressure operated vehicle brake system, in combination, a brake cylinder, brake controlling valve means operative to cause fluid under pressure to be supplied to the brake cylinder to effect an application of the brakes, a valve device conditioned uniformly at one time to operate to cause cut-off of the further supply of fluid under pressure to the brake cylinder upon the attainment of a certain uniform brake cylinder pressure and conditioned uniformly at another time to be ineffective to cause cut-off of the supply of fluid under pressure to the brake cylinder although the brake cylinder pressure increases above the predetermined pressure, and means for conditioning said valve device to be either effective or ineffective to cause cut-off of the supply of fluid under pressure to the brake cylinder dependent upon whether the speed of the vehicle, at the time the application of the brakes is initiated, is below or above a certain uniform speed, respectively.

8. In a fluid pressure operated vehicle brake system, in combination, a brake cylinder, brake controlling valve means operative to cause fluid under pressure to be supplied to the brake cylinder to effect an application of the brakes, a valve device conditioned uniformly at one time to operate to cause cut-off of the further supply of fluid under pressure to the brake cylinder upon the attainment of a certain uniform brake cylinder pressure and conditioned uniformly at another time to be ineffective to cause cut-off of the supply of fluid under pressure to the brake cylinder although the brake cylinder pressure increases above the said certain uniform pressure, and means controlled according to the speed of the vehicle, effective upon the initiation of an application of the brakes when the vehicle is traveling in excess of a predetermined speed for conditioning the said valve device to be ineffective to cause cut-off of the supply of fluid under pressure to the brake cylinder and effective upon the initiation of an application of the brakes when the vehicle is traveling below said predetermined speed for conditioning the said valve device to operate to cause cut-off of the supply of fluid under pressure to the brake cylinder pressure.

9. In a fluid pressure operated vehicle brake system, in combination, a brake cylinder, brake controlling means operative to cause fluid under pressure to be supplied to and released from the brake cylinder to effect application and release, respectively, of the brakes, means effective to limit to a predetermined degree the pressure attained in the brake cylinder upon the initiation of an application of the brakes, a circuit including a source of current, electroresponsive means operating on said circuit and effective as long as said circuit is closed for rendering said last means ineffective to limit the brake cylinder pressure, means, including means operatively responsive to the speed of the vehicle, effective only when an application of the brakes is initiated while the vehicle is travelling at a speed in excess of a certain uniform speed for closing said circuit and thereafter maintaining it closed during the application of the brakes, and means operatively responsive to the pressure of fluid supplied to the brake cylinder for interrupting said circuit whenever the brake cylinder pressure reduces below a certain uniform low pressure.

10. In a fluid pressure operated vehicle brake system, in combination, a brake cylinder, brake controlling means operative to cause fluid under pressure to be supplied to and released from the brake cylinder to effect application and release, respectively, of the brakes, means, including electroresponsive means, for controlling the degree of brake cylinder pressure initially attained upon an application of the brakes, means responsive to the speed of the vehicle for effecting energization of said electroresponsive means only in the event that the speed of the vehicle exceeds a predetermined speed at the time an application of the brakes is initiated, and means effective upon the energization of said electroresponsive means to cause said electroresponsive means to remain energized although the speed of the vehicle subsequently decreases below the said predetermined speed.

11. In a fluid pressure operated vehicle brake system, in combination, a brake cylinder, brake controlling valve means operative to cause fluid under pressure to be supplied to the brake cylinder to effect an application of the brakes, a valve device conditioned at one time to operate to cause cut-off of the further supply of fluid under pressure to the brake cylinder upon the attainment of a certain uniform brake cylinder pressure and conditioned at another time to be ineffective to cause cut-off of the supply of fluid under pressure to the brake cylinder although the brake cylinder pressure exceeds the said certain uniform pressure, electroresponsive means adapted when deenergized to effect conditioning of the said valve device to operate upon the attainment of the said certain uniform brake cylinder pressure to cause cut-off of the supply of fluid under pressure to the brake cylinder and when energized to effect conditioning of the said valve device to be ineffective to cause cut-off of the supply of fluid under pressure to the brake cylinder upon the attainment of the said certain uniform brake cylinder pressure, and means actuated according to the speed of the vehicle for effecting energization of said electroresponsive means only when the speed of the vehicle exceeds a predetermined speed at the time an application of the brakes is initiated.

12. In a fluid pressure operated vehicle brake system, in combination, a brake cylinder, brake controlling valve means operative to cause fluid under pressure to be supplied to the brake cylinder to effect an application of the brakes, a valve device conditioned at one time to operate when a certain uniform brake cylinder pressure is attained to cause cut-off of the further supply of fluid under pressure to the brake cylinder and conditioned at another time to be ineffective when such certain uniform brake cylinder pressure is attained to cause cut-off of the supply of fluid under pressure to the brake cylinder, electroresponsive means adapted when deenergized to effect conditioning of the said valve device to be effective to cause cut-off of the further supply of fluid under pressure to the brake cylinder when the said certain uniform brake cylinder pressure is attained and when energized to effect conditioning of the said valve device to be ineffective to cause cut-off of the further supply of fluid under pressure to the brake cylinder when the said certain uniform brake cylinder pressure is attained, means actuated according to the speed of the vehicle for effecting energization of said electroresponsive means only when the speed of the vehicle exceeds a predetermined speed at the time an application of the brakes is initiated, and means effective upon the energization of said electroresponsive means for causing said electroresponsive means to remain energized although the speed of the vehicle subsequently decreases below the said predetermined speed.

13. In a fluid pressure operated vehicle brake system, in combination, a brake cylinder, brake controlling means operative to cause fluid under pressure to be supplied to and released from the brake cylinder to effect application and release, respectively, of the brakes, means effective to limit to a predetermined degree the pressure initially attained in the brake cylinder upon an application of the brakes, a normally open circuit, electroresponsive means operating on said circuit and adapted upon energization to cause said means to be ineffective to limit the degree of the brake cylinder initially attained upon an application of the brakes, and means, including switch means actuated upon an application of the brakes and means responsive to the speed of the vehicle, for closing said circuit to effect energization of said electroresponsive means.

14. In combination, brake controlling mechanism for a vehicle, said mechanism including electroresponsive means, a governor device for controlling the energization of said electroresponsive means, power transmitting means for driving said governor device in accordance with the speed of the vehicle, and switch means actuated when said power transmitting means is ineffective to drive the said governor device for preventing energization of said electroresponsive means.

15. In a fluid pressure operated vehicle brake system, in combination, a brake cylinder, brake controlling means operative to cause fluid under pressure to be supplied to and released from the brake cylinder to effect application and release, respectively, of the brakes, means for limiting to a predetermined degree the brake cylinder pressure attained initially upon an application of the brakes, means for reducing the brake cylinder pressure to a degree less than the attained pressure, and means controlled according to the speed of the vehicle for rendering said first means ineffective to limit the degree of brake cylinder pressure initially attained in the event of an application of the brakes being initiated at a time that the speed of the train exceeds a predetermined speed and for rendering said second means effective to reduce the brake cylinder pressure whenever the speed of the train reduces to a second predetermined speed lower than said first predetermined speed during an application of the brakes.

16. In a fluid pressure operated vehicle brake system, in combination, a brake cylinder, a brake controlling valve means operative to cause fluid under pressure to be supplied to and released from the brake cylinder to effect application and release, respectively, of the brakes, and valve mechanism for controlling the initial degree of brake cylinder pressure attained upon the initiation of an application of the brakes, said valve mechanism comprising a valve device which controls a communication through which fluid under pressure is supplied from the said brake controlling valve means to the brake cylinder and which is adapted to close said communication when the brake cylinder pressure attains a predetermined degree, and a second valve device for controlling a different communication through which fluid under pressure is supplied from the brake controlling means to the brake cylinder, said second valve device being controlled in accordance with the speed of the vehicle at the time an application of the brakes is initiated.

17. In a fluid pressure operated vehicle brake system, in combination, a brake cylinder, a brake controlling valve means operative to cause fluid under pressure to be supplied to and released from the brake cylinder to effect application and release, respectively, of the brakes, and valve mechanism for controlling the initial degree of brake cylinder pressure attained upon the initation of an application of the brakes, said valve mechanism comprising a valve device which controls a communication through which fluid under pressure is supplied from the said brake controlling valve means to the brake cylinder and which is adapted to close said communication when the brake cylinder pressure attains a predetermined degree, a second valve device for controlling a different communication through which fluid under pressure is supplied from the brake controlling means to the brake cylinder, and means controlled in accordance with the speed of the vehicle for causing said second valve device to open the said different communication if the speed of the vehicle at the time an application of the brakes is initiated exceeds a predetermined speed and for causing said second valve device to close the said different communication if the speed of the vehicle at the time an application of the brakes is initiated is less than said predetermined speed.

18. In a fluid pressure operated vehicle brake system, in combination, a brake cylinder, brake controlling means operative to cause fluid under pressure to be supplied to the brake cylinder to effect an application of the brakes, and means for effecting a reduction in brake cylinder pressure when the said brake controlling means is conditioned to supply fluid under pressure to the brake cylinder, said means comprising a valve controlling the supply of fluid under pressure to the brake cylinder and a second valve controlling a communication through which fluid under pressure is vented from the brake cylinder, and fluid pressure responsive means subject to the opposing forces of brake cylinder pressure and a control pressure and adapted to maintain the said valve and said second valve in open and closed positions respectively as long as subject to the control pressure, said fluid pressure responsive means being moved by the brake cylinder pressure when the control pressure acting thereon is removed to cause operation of said valve and said second valve to closed and open positions respectively.

19. In a fluid pressure operated vehicle brake system, in combination, a brake cylinder, brake controlling means operative to cause fluid under pressure to be supplied to the brake cylinder to effect an application of the brakes, and means for effecting a reduction in brake cylinder pressure when the said brake controlling means is conditioned to supply fluid under pressure to the brake cylinder, said means comprising a valve controlling the supply of fluid under pressure to the brake cylinder and a second valve controlling a communication through which fluid under pressure is vented from the brake cylinder, and fluid pressure responsive means adapted to normally maintain the said valve and said second valve in open and closed positions respectively, and means controlled in accordance with the speed of the vehicle for effecting a variation in the fluid pressure acting on said fluid pressure responsive means when the speed of the vehicle is reduced to a predetermined speed upon an application of the brakes, said fluid pressure responsive means being effective upon such variation in the fluid pressure acting thereon to cause said valve and said second valve to be actuated to closed and open positions respectively.

20. In a fluid pressure operated vehicle brake system, in combination, a brake cylinder, brake controlling means operative to cause fluid under pressure to be supplied to and released from the brake cylinder to effect application and release respectively of the brakes, valve means operative to close a communication through which fluid under pressure is supplied from the brake controlling means to the brake cylinder and to simultaneously establish a communication through which fluid under pressure is released from the brake cylinder, means for limiting the reduction in brake cylinder pressure, by release of fluid under pressure from the brake cylinder through the last said communication, to a predetermined pressure, and means controlled in accordance with the speed of the vehicle for effecting operation of said valve means when the speed of the train reduces to a predetermined speed following the initiation of an application of the brakes.

21. In a fluid pressure operated vehicle brake system, in combination, a brake cylinder, brake controlling means operative to cause fluid under pressure to be supplied to and released from the brake cylinder to effect application and release respectively of the brakes, valve means adapted to be conditioned to close a communication through which fluid under pressure is supplied from the brake controlling means to the brake cylinder and to simultaneously open a communication through which fluid under pressure is released from the brake cylinder, means for preventing reduction in brake cylinder pressure, through the last said communication, below a predetermined pressure, and non-return valve means adapted to permit release of fluid under pressure from the brake cylinder through a communication under control of said brake controlling means when said valve means is conditioned to close the first said communication.

22. In a fluid pressure operated vehicle brake system, in combination, a brake cylinder, brake controlling means operative to cause fluid under pressure to be supplied to the brake cylinder to effect an application of the brakes, a valve device operative to effect a reduction in the pressure of the fluid in the brake cylinder, fluid pressure responsive means subject to opposing fluid pressures and adapted upon a reduction in one of said opposing fluid pressures and the consequent occurrence of a differential force between said opposing fluid pressures to operate said valve device to effect a reduction in the brake cylinder pressure and in the other of said opposing fluid pressures, and biasing means acting in opposition to the differential force of said opposing fluid pressures adapted to operate said valve device to cut off further reduction in brake cylinder pressure and in the other of said opposing fluid pressures when said brake cylinder pressure and the other of said opposing fluid pressures are reduced to a predetermined pressure.

23. In a fluid pressure operated vehicle brake system, in combination, a brake cylinder, brake controlling means operative to cause fluid under pressure to be supplied to the brake cylinder to effect an application of the brakes, a valve device operative to effect a reduction in the pressure of the fluid in the brake cylinder, fluid pressure responsive means subject to opposing fluid pressures and adapted upon a reduction in one of said opposing fluid pressures and the consequent occurrence of a differential force between said opposing fluid pressures to operate said valve device to effect a reduction in the brake cylinder pressure and in the other of said opposing fluid pressures, means responsive to a reduction in the speed of the vehicle to a predetermined speed upon an application of the brakes for effecting a reduction in the said one of the opposing fluid pressures acting on the fluid pressure responsive means, and biasing means acting in opposition to the differential force of said opposing fluid pressures adapted to operate said valve device to cut off further reduction in brake cylinder pressure and in the other of said opposing fluid pressures when said brake cylinder pressure and the other of said opposing fluid pressures are reduced to a predetermined pressure.

24. In a fluid pressure operated vehicle brake system, in combination, a brake cylinder, brake controlling means operative to cause fluid under pressure to be supplied to the brake cylinder to effect an application of the brakes, a valve device for controlling the supply of fluid under pressure from said brake controlling means to said brake cylinder and normally conditioned to permit the supply of the fluid under pressure to the brake cylinder, fluid pressure responsive means adapted to be subjected to the differential force of two opposing fluid pressures, each of which pressures corresponds to the brake cylinder pressure, and responsive to the differential force at a predetermined brake cylinder pressure for actuating said valve device to cut off the further supply of fluid under pressure to the brake cylinder, and means controlled according to the speed of the vehicle for rendering said fluid pressure responsive means ineffective to cause operation of said valve to cut off the supply of fluid under pressure to the brake cylinder, even though the brake cylinder pressure exceeds the said predetermined pressure.

25. In a fluid pressure operated vehicle brake system, in combination, a brake cylinder, brake controlling means operative to cause fluid under pressure to be supplied to the brake cylinder to effect an application of the brakes, a valve device for controlling the supply of fluid under pressure from said brake controlling means to said brake cylinder and normally conditioned to permit the supply of the fluid under pressure to the brake cylinder, fluid pressure responsive means adapted to be subjected to the differential force of two opposing fluid pressures, each of which pressures corresponds to the brake cylinder pressure, and responsive to the differential force at a predetermined brake cylinder pressure for actuating said valve device to cut off the further supply of fluid under pressure to the brake cylinder, and means controlled according to the speed of the vehicle for causing said fluid pressure responsive means to be additionally subjected to fluid under pressure and thereby rendering said fluid pressure responsive means ineffective to cause operation of said valve device to cut off the supply of fluid under pressure to the brake cylinder, even though the brake cylinder pressure exceeds the said predetermined pressure.

26. In a fluid pressure operated vehicle brake system, in combination, a brake cylinder, brake controlling means operative to cause fluid under pressure to be supplied to the brake cylinder to effect an application of the brakes, a valve device for controlling the supply of fluid under pressure from said brake controlling means to said brake cylinder, biasing means for normally positioning said valve device to permit the supply of fluid under pressure to the brake cylinder, fluid pressure responsive means adapted to be subjected to the differential force opposing fluid pressures, each of which pressures corresponds to the brake cylinder pressure, and responsive to the differential force at a predetermined brake cylinder pressure to overcome said biasing means and cause said valve device to be operated to cut off the further supply of fluid under pressure to the brake cylinder, and means controlled according to the speed of the vehicle for preventing said fluid pressure responsive means from overcoming said biasing means and from causing said valve device to cut off the supply of fluid under pressure to the brake cylinder upon an application of the brakes, even though the brake cylinder pressure exceeds the said predetermined pressure.

27. In a fluid pressure operated vehicle brake system, in combination, a brake cylinder, brake controlling means operative to cause fluid under pressure to be supplied to the brake cylinder to effect an application of the brakes, a valve device for controlling the supply of fluid under pressure from said brake controlling means to said brake cylinder, biasing means for normally positioning said valve device to permit the supply of fluid under pressure to the brake cylinder, fluid pressure responsive means adapted to be subjected to the differential force of two opposing fluid pressures, each of which pressures corresponds to the brake cylinder pressure, and responsive to the differential force at a predetermined brake cylinder pressure to overcome said biasing means and cause said valve device to be operated to cut off the further supply of fluid under pressure to the brake cylinder, and means controlled according to the speed of the vehicle for preventing said fluid pressure responsive means from overcoming said biasing means and from causing said valve device to cut off the supply of fluid under pressure to the brake cylinder upon an application of the brakes initiated at a time that the speed of the vehicle exceeds a predetermined speed, even though the brake cylinder pressure exceeds the said predetermined pressure.

28. In a fluid pressure operated vehicle brake system, in combination, means operative to effect application of the brakes with a predetermined braking force, means effective when the speed of the vehicle is reduced to a predetermined low speed upon an application of the brakes for effecting a reduction in the braking force, and means controlling said last means for causing said last means to effect reduction in braking force to different degrees of force depending upon the speed of the vehicle at the time the application of the brakes is initiated.

29. In a fluid pressure operated vehicle brake system, in combination, means operative to effect application of the brakes with a predetermined braking force, means effective when the speed of the vehicle is reduced to a predetermined low speed upon an application of the brakes for effecting a reduction in the braking force, and means controlled according to the speed of the vehicle for so conditioning said last means that it effects reduction in braking force to different degrees of force depending upon the speed of the vehicle at the time the application of the brakes is initiated.

30. In a fluid pressure operated vehicle brake system, in combination, a brake cylinder, brake controlling means operative to cause fluid under pressure to be supplied to the brake cylinder to effect application of the brakes, means operative to effect a reduction in the brake cylinder pressure when the speed of the vehicle is reduced to a predetermined low speed upon an application of the brakes, and means controlled according to the speed of the vehicle for causing said means to effect reduction in brake cylinder pressure to different degrees of pressure depending upon the speed of the vehicle at the time the application of the brakes is initiated.

31. In a fluid pressure operated vehicle brake system, in combination, a brake cylinder, brake controlling means operative to cause fluid under pressure to be supplied to the brake cylinder to effect application of the brakes, means operative to effect a reduction in the brake cylinder pressure when the speed of the vehicle is reduced to a predetermined low speed upon an application of the brakes, and means controlled according to the speed of the vehicle for so conditioning said last means that it effects reduction in brake cylinder pressure to different degrees of pressure depending upon the speed of the vehicle at the time the application of the brakes is initiated.

32. In a fluid pressure operated vehicle brake system, in combination, means operative to effect application of the brakes with a predetermined braking force, means effective when the speed of the vehicle is reduced to a predetermined low speed upon an application of the brakes for effecting a reduction in the braking force, and means controlling said last means for causing said last means to effect reduction in braking force to a certain degree of force upon an application of the brakes initiated when the vehicle is traveling in excess of a predetermined high speed, and to a degree of force less than said certain degree of force upon an application of the brakes initiated when the vehicle is traveling below the said predetermined high speed.

33. In a fluid pressure operated vehicle brake system, in combination, means operative to effect application of the brakes with a predetermined braking force, means effective when the speed of the vehicle is reduced to a predetermined low speed upon an application of the brakes for effecting a reduction in the braking force, and means controlled according to the speed of the vehicle for so conditioning said last means that it effects reduction in braking force to a certain degree of force upon an application of the brakes initiated when the vehicle is traveling in excess of a predetermined high speed, and to a degree of force less than said certain degree of force upon an application of the brakes initiated when the vehicle is traveling below said predetermined high speed.

34. In a fluid pressure operated vehicle brake system, in combination, a brake cylinder, brake controlling means operative to cause fluid under pressure to be supplied to the brake cylinder to effect application of the brakes, means operative to effect a reduction in the brake cylinder pressure when the speed of the vehicle is reduced to a predetermined low speed upon an application of the brakes, and means controlled according to the speed of the vehicle for causing said means to effect reduction in brake cylinder pressure to a certain pressure upon an application of the brakes initiated when the vehicle is traveling in excess of a predetermined high speed, and to a pressure less than said certain pressure upon an application of the brakes initiated when the vehicle is traveling below said predetermined high speed.

35. In a fluid pressure operated vehicle brake system, in combination, a brake cylinder, brake controlling means operative to cause fluid under pressure to be supplied to the brake cylinder to effect application of the brakes, means operative to effect a reduction in the brake cylinder pressure when the speed of the vehicle is reduced to a predetermined low speed upon an application of the brakes, and means controlled according to the speed of the vehicle for so conditioning said last means that it effects reduction in brake cylinder pressure to a certain pressure upon an application of the brakes initiated when the vehicle is traveling in excess of a predetermined high speed, and to a pressure less than said certain pressure upon an application of the brakes initiated when the vehicle is traveling below said predetermined high speed.

36. In a fluid pressure operated vehicle brake system, in combination, a brake cylinder, brake controlling means operative to cause fluid under pressure to be supplied to the brake cylinder to effect application of the brakes, a pressure relief device effective to limit the degree of pressure attained in the brake cylinder, a valve device operative to render said pressure relief device ineffective, and means, including means controlled in accordance with the speed of the vehicle, for said valve device to render said pressure relief device ineffective throughout an application of the brakes when initiated at a speed in excess of a certain uniform speed.

37. In a fluid pressure operated vehicle brake system, in combination, a brake cylinder, brake controlling means operative to cause fluid under pressure to be supplied to the brake cylinder to effect application of the brakes, a pressure relief device effective to limit the degree of pressure attained in the brake cylinder, a valve device operative to render said pressure relief device ineffective, means controlled in accordance with the speed of the vehicle for effecting operation of said valve means to render the pressure relief device ineffective upon initiation of an application of the brakes when the vehicle is traveling in excess of a predetermined speed, and means for causing said valve device to maintain said pressure relief device ineffective throughout an application of the brakes when initiated at a speed in excess of said predetermined speed.

38. In a fluid pressure operated vehicle brake system, in combination, a brake cylinder, brake controlling means operative to cause fluid under pressure to be supplied to the brake cylinder to effect application of the brakes, a pressure relief device in communication with the brake cylinder for limiting the pressure initially attained in the brake cylinder upon an application of the brakes to a certain pressure, valve means operative to cut off communication between said pressure relief device and said brake cylinder to render said pressure relief device ineffective to limit the initial pressure attained in the brake cylinder, and means controlled according to the speed of the vehicle for controlling the operation of said valve means.

39. In a fluid pressure operated vehicle brake system, in combination, a brake cylinder, brake controlling means operative to cause fluid under pressure to be supplied to the brake cylinder to effect application of the brakes, a pressure relief device in communication with the brake cylinder for limiting the pressure initially attained in the brake cylinder upon an application of the brakes to a certain pressure, valve means operative to cut off communication between said pressure relief device and said brake cylinder to render said pressure relief device ineffective to limit the initial pressure attained in the brake cylinder, and means controlled according to the speed of the vehicle for effecting operation of said valve means to cut off communication between the pressure relief device and the brake cylinder upon the initiation of an application of the brakes when the vehicle is traveling in excess of a predetermined speed.

40. In a fluid pressure operated vehicle brake system, in combination, a brake cylinder, brake controlling means operative to cause fluid under pressure to be supplied to the brake cylinder to effect application of the brakes, a pressure relief device adapted to limit to a predetermined pressure the pressure initially attained in the brake cylinder upon an application of the brakes, a second pressure relief device adapted to relieve brake cylinder pressure to a pressure below the said predetermined pressure, valve means for controlling communication between said brake cylinder and said relief devices, and means controlled in accordance with the speed of the vehicle for controlling said valve means.

41. In a fluid pressure operated vehicle brake system, in combination, a brake cylinder, brake controlling means operative to cause fluid under pressure to be supplied to the brake cylinder to effect application of the brakes, a pressure relief device adapted to limit to a predetermined pressure the pressure initially attained in the brake cylinder upon an application of the brakes, a second pressure relief device adapted to relieve brake cylinder pressure to a pressure below the said predetermined pressure, valve means for controlling communication between said brake cylinder and said relief devices, and means controlled in accordance with the speed of the vehicle for effecting operation of said valve means to cut off communication between the brake cylinder and the said first pressure relief device upon an application of the brakes initiated when the vehicle is traveling in excess of a predetermined speed and for effecting operation of said valve means to establish communication between the brake cylinder and said second pressure relief device when the vehicle reduces in speed to a second predetermined speed lower than said first predetermined speed upon an application of the brakes.

42. In a fluid pressure brake for a vehicle, in combination, a brake cylinder, electrically controlled means for controlling a communication through which fluid under pressure is supplied to the brake cylinder, a governor operated according to the speed of the vehicle for controlling the circuit of said electrically controlled means, and switch means normally holding said circuit open and operated upon supplying fluid under pressure to the brake cylinder for closing said circuit.

43. In a fluid pressure brake for a vehicle, in combination, a brake cylinder, electrically controlled means for controlling a communication through which fluid under pressure is supplied to the brake cylinder, a governor operated according to the speed of the vehicle for controlling the circuit of said electrically controlled means, switch means normally holding said circuit open and operated upon supplying fluid under pressure to the brake cylinder for closing the circuit, and a relay device for holding said circuit closed, independently of the governor device.

44. In a fluid pressure brake for a vehicle, in combination, means for effecting an application of the brakes, means controlled according to the speed of the vehicle operative when the speed of the vehicle at the time an application of the brakes is initiated is at or above a first predetermined speed to cause the brakes to be applied with one uniform degree of braking force and operative when the speed of the vehicle at the time an application of the brakes is initiated is less than said first predetermined speed and greater than a second predetermined speed which is lower than the first predetermined speed, to cause the brakes to be applied with a second uniform degree of braking force less than the said one uniform degree of braking force, and means controlled according to the speed of the vehicle and operative whenever the vehicle is traveling at or less than the second predetermined speed for limiting the braking force to a third degree of braking force which is less than the said second uniform degree of braking force.

45. In a fluid pressure brake for a vehicle, in combination, means for effecting an application of the brakes, electrically controlled means for controlling the degree of braking force initially produced upon effecting an application of the brakes, and a circuit-controlling device operative to different positions according to the speed of the vehicle for so controlling said electrically controlled means as to cause a high initial degree of braking force to be produced when the speed of the vehicle at the time an application of the brakes is initiated is at or above a predetermined speed and a lower initial degree of braking force when the speed of the vehicle at the time an application of the brakes is initiated is below the said predetermined speed.

46. In a fluid pressure brake for a vehicle, in combination, means for effecting an application of the brakes, means controlled according to the speed of the vehicle and operative upon an application of the brakes effected when the speed of the vehicle, at the time an application of the brakes is initiated, is at or above a certain uniform speed to cause the brakes to be applied with one uniform degree of braking force and when the speed of the vehicle, at the time an application of the brakes is initiated, is less than the said uniform speed to cause the brakes to be applied with uniform degree of braking force less than the said one uniform degree of braking force, and means operative to render the speed-controlled means ineffective to cause reduction from the said one uniform degree of braking force to the said lesser uniform degree of braking force as the speed of the vehicle decreases from a speed above to a speed below the said certain uniform speed.

47. In a fluid pressure brake for a vehicle, in combination, a brake cylinder, brake controlling means operative to cause fluid under pressure to be supplied to the brake cylinder to effect application of the brakes, electrically controlled means for controlling the degree of brake cylinder pressure, a governor device operated according to the speed of the vehicle, a switch device operated by the governor device for controlling the circuit of said electrically controlled means, and switch means in the circuit of the electrically controlled means, said switch means being normally in circuit-opening position and operated to a circuit-closing position when fluid under pressure is supplied to the brake cylinder.

48. In a fluid pressure brake for a vehicle, in combination, a brake cylinder, brake controlling means operative to cause fluid under pressure to be supplied to the brake cylinder to effect application of the brakes, electrically controlled means for controlling the degree of brake cylinder pressure, a governor device operated according to the speed of the vehicle for controlling the circuit of said electrically controlled means, switch means in the circuit of the electrically controlled means normally in circuit-opening position and operated to circuit-closing position when fluid under pressure is supplied to the brake cylinder, and a relay device operating on the circuit of the electrically controlled means for holding the circuit of the electrically controlled means closed independently of operation of the governor device from circuit-closing to circuit-opening position.

49. In a fluid pressure brake for a vehicle, in combination, means for effecting an application of the brakes, electrically controlled means for controlling the degree of braking force initially produced upon effecting an application of the brakes, a circuit-controlling device operative to different positions according to the speed of the vehicle for so controlling said electrically controlled means as to cause a high initial degree of braking force to be produced when the speed of the vehicle, at the time an application of the brakes is initiated, is above a predetermined speed and a lower initial degree of braking force when the speed of the vehicle, at the time an application of the brakes is initiated, is below the said predetermined speed, and means for rendering said circuit-controlling device ineffective to control the electrically controlled means so as to cause a variation in the initial degree of braking force as the speed of the vehicle decreases from a speed in excess of the said predetermined speed to a speed below the predetermined speed.

50. In a vehicle brake system, brake controlling means operative to effect the application and the release of the brakes, electro-responsive means effective upon deenergization to cause the degree of braking force with which an application of the brakes is effected to be limited to a predetermined force and effective upon energization to cause the braking force to be greater than the said predetermined force, circuit-controlling means operative to circuit-closing position to effect energization of the electro-responsive means only as long as the vehicle speed exceeds a predetermined uniform speed, and means effective to maintain said electro-responsive means energized, once said circuit-controlling means causes energization thereof, notwithstanding a decrease in vehicle speed below the predetermined speed.

51. In a vehicle brake system, in combination, a brake cylinder, means providing two parallel communications through which fluid under pressure may be supplied to the brake cylinder to effect application of the brakes, means for effecting the supply of fluid under pressure simultaneously through both said communications to the brake cylinder, a valve controlling one of said communications and operatively responsive to a predetermined uniform brake cylinder pressure to close the communication controlled thereby, a valve device controlling the other of said communications, and speed-responsive means operated according to the speed of the vehicle for controlling said valve device.

52. In a vehicle brake system, in combination, a brake cylinder, means providing two parallel communications through which fluid under pressure may be supplied to the brake cylinder to effect an application of the brakes, means for effecting the supply of fluid under pressure simultaneously through both said communications to the brake cylinder, a valve controlling one of said communications and operatively responsive to a predetermined uniform brake cylinder pressure to close the communication controlled thereby, a valve device controlling the other of said communications, and means controlled according to the speed of the vehicle for causing said valve device to close and maintain closed the communication controlled thereby only when the application of the brakes is initiated while the vehicle is traveling less than a predetermined uniform speed.

53. In a vehicle brake system, in combination, a brake cylinder, brake controlling means operative to cause fluid under pressure to be supplied to the brake cylinder to effect application of the brakes, a pressure relief device adapted to limit to a predetermined uniform pressure the pressure initially attained in the brake cylinder upon an application of the brakes, a second pressure relief device adapted to relieve brake cylinder pressure to a uniform pressure below the said predetermined uniform pressure, valve means for controlling communication between said brake cylinder and said pressure relief devices, means controlled in accordance with the speed of the vehicle for effecting operation of said valve means to cut off communication between the brake cylinder and the said first pressure relief device upon an application of the brakes initiated when the vehicle is traveling in excess of a first predetermined speed and for effecting operation of said valve means to establish communication between the brake cylinder and said second pressure relief device when the vehicle reduces in speed to a second predetermined speed lower than said first predetermined speed upon an application of the brakes, and means for causing said valve means to maintain cut off the communication between the brake cylinder and the first pressure relief device regardless of the decrease in speed of the vehicle from a speed in excess of the said first predetermined speed to a speed below said first predetermined speed.

54. In a vehicle brake system, in combination, a brake cylinder, brake controlling means operative to cause fluid under pressure to be supplied to the brake cylinder to effect application of the brakes, a normally open supply valve operative to cut off the supply of fluid under pressure from the brake controlling means to the brake cylinder, a pair of connected movable abutments having different areas and a normally vented chamber therebetween, said abutments being moved in one direction by the differential force of a certain uniform brake cylinder pressure acting in opposing relation on the said abutments outside said chamber, when said chamber is vented, to cause said valve to operate to cut off the supply of fluid under pressure to the brake cylinder, and means controlled according to the speed of the vehicle for admitting fluid under pressure to said chamber only upon the application of the brakes at a time that the vehicle is traveling in excess of a certain uniform speed, the differential force of the fluid pressure acting on said abutments within the chamber being effective to oppose and prevent movement of the abutments in said one direction to cause said valve to operate to cut off the supply of fluid under pressure to the brake cylinder upon the attainment of said certain uniform brake cylinder pressure.

55. In a brake system for vehicles, in combination, means providing a plurality of chambers, means operative to cause fluid under pressure to be supplied for charging said chambers when initiating an application of the brakes, means controlled according to the speed of the vehicle for selectively determining which chamber or chambers are charged upon operation of said last means, and means operative according to which chamber or chambers are charged for effecting different corresponding degrees of application of the brakes.

56. In a brake system for vehicles, in combination, brake control means operative to control the degree of application of the brakes, a plurality of cooperating fluid pressure responsive means of different areas for operating said brake control means, and means controlled according to the speed of the vehicle for varying the degree of fluid pressure unbalance selectively on said plurality of fluid pressure responsive means to cause operation of the said brake control means to vary the degree of application of the brakes.

57. In a fluid pressure brake for a vehicle, in combination, a brake cylinder, brake controlling means operative to cause fluid under pressure to be supplied to the brake cylinder to effect application of the brakes, electrically controlled means for controlling the degree of brake cylinder pressure, a governor device operated according to the speed of the vehicle, a switch device operated by the governor device for controlling the circuit of said electrically controlled means, and switch means in the circuit of the electrically controlled means, said switch means being normally in circuit-opening position and operated to a circuit-closing position upon initiating an application of the brakes.

58. In a vehicle brake system, brake control means including electroresponsive means effective to control the degree of application of the brakes, a normally open circuit on which said electroresponsive means operates, switch means operated responsively to the speed of the vehicle for controlling said circuit, and independent switch means also in said circuit and actuated to circuit-closing position upon initiation of an application of the brakes.

59. In a vehicle brake system, in combination, valve means operative to control the degree of application and the release of the brakes, and a plurality of movable abutments having different areas for controlling the operation of said valve means, each abutment having a normally vented chamber at one side, the supply of fluid under pressure to which is effective to urge the abutment in one direction, and means for supplying fluid under pressure at one time to one of said chambers, and at another time to another of said chambers, to cause said valve means to operate to vary the degree of the application.

60. In a vehicle brake system, in combination, valve means operative to control the degree of application and the release of the brakes, and a plurality of movable abutments having different areas for controlling the operation of said valve means, each abutment having a chamber at one side, the supply of fluid under pressure to which is effective to urge the abutment in one direction, and means for selectively supplying fluid under pressure to said chambers.

61. In a vehicle brake system, in combination, valve means operable to control the application and the release of the brakes, a plurality of movable abutments, and means cooperating with said abutments to form a plurality of chambers to which fluid under pressure may be supplied to a selected degree in effecting an application of the brakes, said abutments being so constructed and arranged as to cause operation of said valve means to produce a certain degree of application of the brakes whenever fluid under pressure is supplied to one of said chambers, and to produce a different degree of application of the brakes when, in the absence of fluid pressure in said one chamber, fluid under pressure is supplied to another of said chambers.

62. In a fluid pressure brake system, in combination, valve means operable to control the application and the release of the brakes, a plurality of movable abutments of different effective pressure areas, and means cooperating with said abutments to form a plurality of pressure chambers associated with said abutments to which fluid under pressure may be supplied in effecting an application of the brakes, said abutments being so arranged that whenever fluid at a given pressure is supplied to one of said chambers associated with one of said abutments said valve means operates to produce a brake application to a certain degree corresponding to the given fluid pressure, and when, in the absence of fluid pressure in said one chamber, fluid under pressure is supplied to another chamber associated with a different abutment said valve means operates to produce a brake application to a degree different from said certain degree and dependent upon the relation of the area of said one abutment to the area of said different abutment.

63. In a vehicle brake system, in combination, a brake cylinder, valve means operable to control the supply of fluid under pressure to and its release from said brake cylinder, a plurality of movable abutments, and means cooperating with said abutments to form a plurality of pressure chambers, one of said abutments being adapted to be subject on one side to fluid at brake cylinder pressure and selectively subject or not subject on the other side to fluid under pressure in one of said chambers, when an application of the brakes is effected, said abutments being so constructed and arranged as to cause operation of said valve means to produce a certain brake cylinder pressure whenever fluid at a given pressure is supplied to said one chamber, and to produce a different brake cylinder pressure when said one abutment is not subject to fluid under pressure in said one chamber and fluid under pressure is supplied to another of said chambers.

64. In a vehicle brake system, in combination, a brake cylinder, valve means operable to control the supply of fluid under pressure to and its release from said brake cylinder, a plurality of movable abutments of different effective pressure areas, and means cooperating with said abutments to form a plurality of pressure chambers to which fluid under pressure may be supplied to a selected degree in effecting an application of the brakes, one of said abutments being adapted to be subject on one side to fluid at brake cylinder pressure and selectively subject or not subject on the other side to fluid under pressure in one of said chambers, when an application of the brakes is effected, said abutments being arranged to control the operation of said valve means in such manner that whenever said one abutment is subject to fluid at a certain pressure in said one chamber said valve means operates to produce a certain brake cylinder pressure corresponding to the certain pressure, and that whenever said one abutment is not subject to fluid under pressure in said one chamber and fluid under pressure is supplied to another one of said chambers associated with a different abutment, said valve means operates to produce a brake cylinder pressure different from said certain brake cylinder pressure and dependent upon the relation of the area of said one abutment to the area of the said different abutment.

65. In a fluid pressure brake system, in combination, a brake cylinder, a valve device for controlling the supply of fluid under pressure to and its release from said brake cylinder, two diaphragms arranged in spaced relationship, and means cooperating with said diaphragms to form at least two pressure chambers to which fluid under pressure may be supplied in effecting an application of the brakes, said diaphragms being so arranged as to control the operation of said valve device to produce up to a certain maximum brake cylinder pressure whenever fluid under pressure is supplied to one of said chambers, and to produce up to a maximum brake cylinder pressure less than said certain maximum brake cylinder pressure when fluid under pressure is supplied to the other of said chambers but not to said one chamber.

66. In a fluid pressure brake system, in combination, a brake cylinder, a valve device operable to control the supply of fluid under pressure to and its release from said brake cylinder, two diaphragms of different effective pressure areas, and means cooperating with said two diaphragms to form two pressure chambers to which fluid under pressure may be supplied in effecting an application of the brakes, said diaphragms being so arranged as to cause operation of said valve device whenever fluid under pressure is supplied to one of said two chambers to produce up to a certain maximum brake cylinder pressure, and when fluid under pressure is supplied to the other of said two chambers and not to said one chamber to produce up to a certain maximum brake cylinder pressure less than said certain maximum brake cylinder pressure, and dependent upon the relation of the area of the one diaphragm to the area of the other diaphragm.

67. In a vehicle brake system, in combination, a brake cylinder, a valve device for controlling the supply of fluid under pressure to and its release from said brake cylinder, two movable abutments of different effective pressure areas disposed in a spaced relationship, and means cooperating with said two abutments to form two pressure chambers to which fluid under pressure may be supplied in effecting an application of the brakes, one of said abutments being adapted to be subject on one side to fluid at brake cylinder pressure and selectively subject or not subject on the other side to the pressure of fluid in one of said chambers, said two abutments being arranged to control the operation of said valve device in such manner that said valve device operates whenever fluid under pressure is supplied to said one chamber to produce up to a certain maximum brake cylinder pressure, and when fluid under pressure is supplied to the other of said two chambers but not to said one chamber to produce up to a certain brake cylinder pressure less than said certain maximum brake cylinder pressure and dependent upon the relation of the area of the one abutment to the area of the other abutment.

68. In a vehicle brake system, in combination, valve means for controlling the application and release of the brakes, a plurality of movable abutments, means cooperating with said abutments to form a plurality of pressure chambers to which fluid under pressure may be supplied in effecting an application of the brakes, said abutments being arranged to control the operation of said valve means in such manner that said valve means operates to produce up to a certain maximum degree of application of the brakes whenever fluid under pressure is supplied to one of said chambers, and to produce up to a different maximum degree of application of the brakes when fluid under pressure is supplied to another of said chambers but not to said one chamber, and means for controlling the supply of fluid under pressure to and its release from said chambers.

69. In a vehicle brake system, in combination, valve means for controlling the application and release of the brakes, a plurality of movable abutments, means cooperating with said abutments to form a plurality of pressure chambers to which fluid under pressure may be supplied in effecting an application of the brakes, said abutments being arranged to control the operation of said valve means in such manner that said valve means operates to produce up to a certain maximum degree of application of the brakes whenever fluid under pressure is supplied to one of said chambers, and to produce a different degree of application of the brakes when fluid under pressure is supplied to a different one of said chambers and not to said one chamber, and means for supplying fluid under pressure to said one chamber at one time and for supplying fluid under pressure to the said different chamber and not to said one chamber at another time.

70. In a vehicle brake system, brake control means including electroresponsive means effective to control the degree of application of the brakes, a normally open circuit on which said electroresponsive means operates, a pair of switch means jointly effective in the closed positions thereof to cause the completion of the said circuit and the consequent energization of the electroresponsive means, one of said switch means being operated to closed position only as long as the speed of the vehicle exceeds a certain uniform speed, the other of said switch means being in open position when the brakes are released and actuated to closed position upon the initiation of an application of the brakes, and means effective when the said electroresponsive means is energized under the control of said pair of switch means for thereafter maintaining said electroresponsive means energized notwithstanding the subsequent opening of the said one of the switch means.

71. In a vehicle brake system, brake control means including electroresponsive means effective to control the degree of application of the brakes, a normally opened circuit on which said electroresponsive means operates, a pair of switch means jointly effective in the closed positions thereof to cause the completion of the said circuit and the consequent energization of the electroresponsive means, one of said switch means being operated to closed position only as long as the speed of the vehicle exceeds a certain uniform speed, the other of said switch means being in open position when the brakes are released and actuated to closed position upon the initiation of an application of the brakes, and means effective when the said electroresponsive means is energized under the control of said pair of switch means for thereafter maintaining said electroresponsive means energized, notwithstanding the subsequent opening of the said one of the switch means, said last means being rendered ineffective when the said other of the switch means is restored to open position.

72. A vehicle brake equipment comprising, in combination, a brake cylinder, a valve device including a casing having two chambers and operatively controlled by the pressure of fluid supplied to said chambers for controlling the supply of fluid under pressure to the said brake cylinder, a source of fluid under pressure, means operative upon effecting an application of the brakes for supplying fluid under pressure from said source to one of said chambers, and means operative in accordance with a variable operating condition of the vehicle for controlling the supply of fluid under pressure from said source to the other of said chambers.

73. A vehicle brake equipment comprising, in combination, a brake cylinder, a valve device including a casing having two chambers and operatively controlled by the pressure of the fluid supplied to said chambers for controlling the supply of fluid under pressure to the said brake cylinder, means operative upon effecting an application of the brakes, for supplying fluid under pressure to one of said chambers, and means operative in accordance with a variable operating condition of the vehicle for controlling the supply of fluid under pressure to the other of said chambers, and a common source from which fluid under pressure is supplied to both of said chambers.

74. The method of operating vehicle brakes which comprises effecting an application of the brakes to one degree if the speed of the vehicle at the time the application of the brakes is initiated is above a certain uniform speed, effecting an application of the brakes to a second degree, lower than the said one degree, if the speed of the vehicle at the time the application of the brakes is initiated is below the said certain uniform speed, maintaining the said one or the said second degree of application of the brakes until the speed of the vehicle reduces under the application of the brakes to a second certain uniform speed lower than the first said uniform speed, and then effecting reduction in the degree of the application to one certain uniform degree if the application of the brakes was initiated at the said one degree and to a second certain minimum degree lower than said one certain minimum degree if the application was initiated at the said second degree.

75. A vehicle brake equipment comprising, in combination, a brake cylinder, means providing communication through which fluid under pressure is supplied to the brake cylinder to effect application of the brakes, normally open valve means effective when closed to cause closing of said communication and the consequent cutting off of the supply of fluid under pressure to the brake cylinder to limit the maximum pressure therein on an application of the brakes, and two connected movable abutments of different effective pressure areas, one of said abutments having at one side thereof a first chamber and at the opposite side a second chamber, and the other of the abutments having at one side thereof said second chamber and at the opposite side a third chamber, said one abutment being subject upon an application of the brakes to a fluid pressure in said first chamber corresponding to brake cylinder pressure and the other abutment being subject upon an application of the brakes to a fluid pressure in said third chamber corresponding to brake cylinder pressure, said abutments being shifted in response to the differential force thereon of the pressure in said first and third chambers at a certain uniform brake cylinder pressure when said second chamber is not charged with fluid under pressure for operating said valve to cut off the supply of fluid under pressure to the brake cylinder through said communication and being unresponsive to such differential force when said second chamber is charged with fluid under pressure.

76. A vehicle brake equipment comprising, in combination, a brake cylinder, means providing communication through which fluid under pressure is supplied to the brake cylinder to effect application of the brakes, normally open valve means effective when closed to cause closing of said communication and the consequent cutting off of the supply of fluid under pressure to the brake cylinder to limit the maximum pressure therein on an application of the brakes, two connected movable abutments of different effective pressure areas, one of said abutments having at one side thereof a first chamber and at the opposite side a second chamber, and the other of the abutments having at one side thereof said second chamber and at the opposite side a third chamber, said one abutment being subject upon an application of the brakes to a fluid pressure in said first chamber corresponding to brake cylinder pressure and the other abutment being subject upon an application of the brakes to a fluid pressure in said third chamber corresponding to brake cylinder pressure, said abutments being shifted in response to the differential force thereon of the pressure in said first and third chambers at a certain uniform brake cylinder pressure when said second chamber is not charged with fluid under pressure for operating said valve to cut off the supply of fluid under pressure to the brake cylinder through said communication and being unresponsive to such differential force when said second chamber is charged with fluid under pressure, and means for charging said second chamber with fluid under pressure throughout an application of the brakes only when the speed of the vehicle exceeds a certain uniform speed at the time an application of the brakes is initiated.

77. In a vehicle brake system, in combination, a brake cylinder, brake controlling means operative to cause fluid under pressure to be supplied to the brake cylinder to effect an application of the brakes, a valve controlling the supply of fluid under pressure to the brake cylinder as effected by the brake controlling means, a second valve controlling a communication through which fluid under pressure is vented from the brake cylinder, fluid pressure responsive means subject to the opposing forces of brake cylinder pressure and a control pressure and adapted to maintain said valve and said second valve in open and closed positions respectively as long as subjected to the control pressure, said fluid pressure responsive means being moved by the brake cylinder pressure when the control pressure acting thereon is removed to cause operation of said valve and said second valve to closed and open positions respectively, and means controlled according to the speed of the vehicle for causing said fluid pressure responsive means to be subjected to control pressure as long as the speed of the vehicle is above a certain speed and for causing said control pressure to be removed when the speed of the vehicle reduces below said certain speed.

78. In a vehicle or train brake system, in combination, means, including a plurality of electroresponsive means, for causing different degrees of application of the brakes to be effected dependent upon the energization or deenergization of the individual electroresponsive means, and means controlled according to a variable operating condition of the vehicle or train for selectively controlling energization and deenergization of the individual electroresponsive means.

79. In a vehicle or train brake system, in combination, means, including a plurality of electroresponsive means, for causing different degrees of application of the brakes to be effected dependent upon the energization or deenergization of the individual electroresponsive means, and means controlled according to the speed of the vehicle or train for selectively controlling energization and deenergization of the individual electroresponsive means.

80. In a vehicle brake equipment, in combination, valve means for controlling the degree of application of the brakes, fluid pressure responsive means adapted to be subjected in opposing relation to two separate fluid pressures each corresponding to the degree of the brake application for operating said valve means, and means controlled according to a variable operating condition of the vehicle for varying the area of the fluid pressure responsive means subject to the effective force of one of said pressures so as to cause the valve means to establish different degrees of brake application dependent upon the area of the fluid pressure responsive means subject to the effective force of the said one pressure.

81. In a vehicle brake system, means for effecting the application and release of the brakes, electro-responsive means effective when energized to cause application of the brakes with one degree of braking force and when deenergized to cause application of the brakes with a different degree of braking force, switch means operative at a certain uniform vehicle speed, as the vehicle reduces in speed, to effect energization of the said electro-responsive means, and a second switch means effective as long as the brakes are not applied with at least a certain degree of braking force for preventing the first said switch means from causing energization of said electro-responsive means.

82. In a vehicle brake equipment, in combination, a brake cylinder, means providing a communication, means for supplying fluid under pressure to the brake cylinder and for releasing fluid under pressure from the brake cylinder through said communication to effect application and release of the brakes, means operative in response to the speed of the vehicle, valve means controlled by the speed-responsive means effective to prevent the supply of fluid under pressure from said communication to the brake cylinder and to cause reduction of the pressure in the brake cylinder to a certain pressure whenever the vehicle reduces below a certain uniform speed, and a one-way valve for preventing the supply of fluid under pressure therepast from the said communication to the brake cylinder and adapted to permit reverse flow of fluid under pressure therepast from the brake cylinder to said communication to enable the reduction in brake cylinder pressure to a pressure lower than said certain pressure and corresponding to the pressure in said communication whenever the pressure in said communication is reduced below that in the brake cylinder.

CLYDE C. FARMER.
ELLIS E. HEWITT.

CERTIFICATE OF CORRECTION.

Patent No. 2,109,166.   February 22, 1938.

CLYDE C. FARMER, ET AL.

It is hereby certified that error appears in the printed specification of the above numbered patent requiring correction as follows: Page 23, second column, line 46, claim 36, before the word "said" insert causing; page 28, first column, line 33, claim 72, strike out the syllable "op-"; and that the said Letters Patent should be read with these corrections therein that the same may conform to the record of the case in the Patent Office.

Signed and sealed this 31st day of May, A. D. 1938.

(Seal)   Henry Van Arsdale,
Acting Commissioner of Patents.